US012395073B2

(12) United States Patent
Chin et al.

(10) Patent No.: US 12,395,073 B2
(45) Date of Patent: Aug. 19, 2025

(54) METHOD AND APPARATUS FOR CONTROLLING TOTEM-POLE PFC CIRCUIT, AND ELECTRONIC DEVICE

(71) Applicant: Huawei Digital Power Technologies Co., Ltd., Shenzhen (CN)

(72) Inventors: Ken Chin, Shenzhen (CN); Shanglin Mo, Dongguan (CN); Shuaibing Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 174 days.

(21) Appl. No.: 18/347,040

(22) Filed: Jul. 5, 2023

(65) Prior Publication Data

US 2024/0014733 A1    Jan. 11, 2024

(30) Foreign Application Priority Data

Jul. 5, 2022 (CN) .......................... 202210783696.4

(51) Int. Cl.
*H02M 1/42* (2007.01)
*H02M 1/00* (2006.01)

(52) U.S. Cl.
CPC ....... *H02M 1/4266* (2013.01); *H02M 1/0009* (2021.05); *H02M 1/0058* (2021.05); *H02M 1/4233* (2013.01)

(58) Field of Classification Search
CPC ............. H02M 1/0009; H02M 1/0058; H02M 1/4233; H02M 1/4266
See application file for complete search history.

(56) References Cited

U.S. PATENT DOCUMENTS

2019/0305671 A1* 10/2019 Matsuura ............... H02M 1/083
2022/0255415 A1* 8/2022 Ishibashi ............. H02M 1/0009
2022/0271650 A1* 8/2022 Ishibashi ............. H02M 1/4233

FOREIGN PATENT DOCUMENTS

CN        106033929 B      11/2018

OTHER PUBLICATIONS

Huang et al., "Predictive ZVS Control With Improved ZVS Time Margin and Limited Variable Frequency Range for a 99% Efficient, 130-W/in3 MHz GaN Totem-Pole PFC Rectifier", IEEE Transactions on Power Electronics, Jul. 1, 2019, vol. 34, No. 7, 13 pages.

* cited by examiner

*Primary Examiner* — Jue Zhang
*Assistant Examiner* — Lakaisha Jackson
(74) *Attorney, Agent, or Firm* — Maier & Maier, PLLC

(57) ABSTRACT

A method for controlling a totem-pole PFC circuit. When an alternating current of an input end of a totem-pole PFC circuit is in a positive half period, if a previous switching period is less than specified duration, after charging of a PFC inductor is completed, a switch that enables the PFC inductor to be discharged is first delayed for specified threshold duration, and then the switch that enables the PFC inductor to be discharged is turned on, so that the switch that enables the PFC inductor to be discharged is turned on only once. In an existing PFC application, when an input voltage is in a positive half period, a switch that enables a PFC inductor to be discharged needs to be turned on twice.

17 Claims, 11 Drawing Sheets

METHOD AND APPARATUS FOR CONTROLLING TOTEM-POLE PFC CIRCUIT, AND ELECTRONIC DEVICE

CROSS-REFERENCE TO RELATED APPLICATION

This application claims priority to Chinese Patent Application No. 202210783696.4, filed on Jul. 5, 2022, which is hereby incorporated by reference in its entirety.

TECHNICAL FIELD

The embodiments relate to the field of electric energy conversion technologies, a method and an apparatus for controlling a totem-pole PFC circuit, and an electronic device.

BACKGROUND

A power factor refers to a relationship between effective power and total power consumption (apparent power), namely, a ratio of the effective power to the total power consumption and is one of important indicators for measuring performance of power consuming devices such as components and electronic devices. Therefore, a value of the power factor may be used to determine a degree of effective utilization of power of a power consuming device. A larger value of the power factor indicates a higher power utilization rate of the power consuming device and better performance.

Power factor correction (PFC) is a common technology in the power supply field. An existing PFC circuit has problems such as low efficiency, a low switching frequency, and a large size of a magnetic component. Based on this, a totem-pole PFC circuit is proposed in the conventional technology, to resolve the problems of the existing PFC circuit. However, in a switching period of the totem-pole PFC circuit, a switch that is to be turned on needs to be turned on for a plurality of times. Each time the switch is turned on, electricity of a bootstrap capacitor in a bootstrap circuit is consumed. If the switch is turned on for a plurality of times, the bootstrap capacitor needs to have a large capacitance value to ensure that the totem-pole PFC circuit operates normally. An increase of the capacitance value of the bootstrap capacitor increases circuit costs, and increases a volume of the capacitor, which is unfavorable for miniaturization of a device installed with the totem-pole PFC circuit.

SUMMARY

To resolve the foregoing problems, the embodiments may provide a method and an apparatus for controlling a totem-pole PFC circuit, and an electronic device. When an alternating current of an input end of the totem-pole PFC circuit is in a positive half period, if a previous switching period is less than specified duration, after a PFC inductor is fully charged, a switch that enables the PFC inductor to be discharged is first delayed for specified threshold duration, and then the switch that enables the PFC inductor to be discharged is turned on, so that the switch that enables the PFC inductor to be discharged is turned on only once. In an existing PFC application, when an input voltage is in a positive half period, a switch that enables a PFC inductor to be discharged needs to be turned on twice. Compared with the existing PFC circuit, the totem-pole PFC circuit may allow the switch that enables the PFC inductor to be discharged to be turned on only once, so that power consumption of a bootstrap capacitor in a bootstrap circuit connected to a gate of a switch S1 can be reduced. The bootstrap capacitor does not need to increase a volume. This reduces circuit costs and facilitates miniaturization of a device installed with the totem-pole PFC circuit.

Therefore, the embodiments may use the following solutions:

According to a first aspect, the embodiments may provide a method for controlling a totem-pole PFC circuit. The method is performed by a controller and includes: sampling an electrical parameter of a PFC inductor in the totem-pole PFC circuit; determining duration of a previous switching period of the totem-pole PFC circuit based on the electrical parameter of the PFC inductor, where the duration of the previous switching period is determined based on duration of previous charging of the PFC inductor and duration of previous discharging of the PFC inductor; and sending a control signal to a first switch when the duration of the previous switching period is less than specified switching duration, where the first switch is a switch that enables the PFC inductor to be discharged when an alternating current of an input end of the totem-pole PFC circuit is in a positive half period, and the control signal is used to enable a bootstrap capacitor in a bootstrap circuit coupled to the switch to be discharged.

In this implementation, when performing switching conversion in this switching period, the totem-pole PFC circuit first obtains the duration (that is, a switching frequency) of the previous switching period, and determines whether the duration of the previous switching period is greater than the specified switching duration. If the duration of the previous switching period is less than the specified switching duration, in this switching period, the switch that enables the PFC inductor to be discharged is delayed for the specified threshold duration, and after the PFC inductor is fully charged, the switch that enables the PFC inductor to be discharged is turned on, so that the switch that enables the PFC inductor to be discharged is turned on only once. Compared with the conventional technology, in a switching period, the switch that enables the PFC inductor to be discharged is canceled to be turned on for the first time, and the switch is turned on for the second time, so that power consumption of the bootstrap capacitor CQbst in the bootstrap circuit can be reduced, and the totem-pole PFC circuit can implement full input range ZVS. The totem-pole PFC circuit in the embodiments may be applied to a device with a small volume. This increases an application scenario of the totem-pole PFC circuit.

In an implementation, the determining duration of a previous switching period of the totem-pole PFC circuit based on the electrical parameter of the PFC inductor includes: detecting a current value of a current flowing through the PFC inductor, where the electrical parameter is the current value; and determining a time point at which a current value of a current previously flowing through the PFC inductor decreases from a first threshold to zero and a time point at which the current value of the current previously flowing through the PFC inductor rises from zero to the first threshold, to obtain the duration of the previous switching period.

In this implementation, the duration of the previous switching period of the totem-pole PFC circuit is obtained based on the current flowing through the PFC inductor, and a time point at which the current changes when the PFC inductor is charged and a time point at which the current changes when the PFC inductor is discharged.

In an implementation, sending the control signal to the first switch further includes: sending the control signal to the first switch after a delay of specified threshold duration, where the specified threshold duration is greater than or equal to a difference between the specified switching duration and the previous switching period.

In an implementation, the method further includes: detecting the current value of the current flowing through the PFC inductor, where the electrical parameter is the current value; and determining duration of a current switching period of the totem-pole PFC circuit when the current value of the current flowing through the PFC inductor is less than a second threshold.

In this implementation, the current flowing through the PFC inductor is used. When the current value is less than a specified threshold, it indicates that the totem-pole PFC circuit completes a charging process and a discharging process of the PFC inductor in the current switching period. The duration of the current switching period is calculated, and a parameter is provided for whether to delay a conduction time point in a next switching period.

In an implementation, the method further includes: stopping sending the control signal to the first switch; sampling an electrical parameter of the input end of the totem-pole PFC circuit and an electrical parameter of an output end of the totem-pole PFC circuit, where the output end is a port through which the totem-pole PFC circuit outputs a direct current to the outside; and sending the control signal to a second switch, where the second switch is a switch that enables the PFC inductor to be charged when the alternating current of the input end of the totem-pole PFC circuit is in the positive half period.

In an implementation, the sending the control signal to a second switch includes: detecting an input voltage of a detection circuit when a voltage of the input end of the totem-pole PFC circuit is not greater than a half of a voltage of the output end of the totem-pole PFC circuit, where the input voltage of the detection circuit is a voltage from a high-frequency bridge arm in the totem-pole PFC circuit to a resistor in the detection circuit; and sending the control signal to the second switch when the input voltage of the detection circuit is positive zero-crossing.

In this implementation, when the totem-pole PFC circuit enters a DCM operating mode, because the duration of the current switching period of the totem-pole PFC circuit is less than the specified switching duration, the control signal is not immediately sent to the first switch, so that the first switch is turned off. In this case, the totem-pole PFC circuit enters an LC resonance, and duration from oscillation to the current switching period is not less than the specified switching duration, and then the control signal is sent to the second switch, so that the switch is turned on, and the totem-pole PFC circuit enters a next switching period, to implement zero voltage switching of the second switch.

In an implementation, the sending the control signal to a second switch includes: detecting an input voltage of a detection circuit when a voltage of the input end of the totem-pole PFC circuit is greater than a half of a voltage of the output end of the totem-pole PFC circuit; sending the control signal to the first switch when the input voltage of the detection circuit is negative zero-crossing; detecting the current value of the current flowing through the PFC inductor; stopping sending the control signal to the first switch when the current value of the current flowing through the PFC inductor is determined to be less than the second threshold; and sending the control signal to the second switch when the input voltage of the detection circuit is positive zero-crossing.

In this implementation, when the totem-pole PFC circuit enters a DCM operating mode, because the duration of the current switching period of the totem-pole PFC circuit is less than the specified switching duration, the control signal is not immediately sent to the first switch, so that the first switch is turned off. If the voltage of the PFC inductor is detected to be negative zero-crossing, a time point at which the voltage of the PFC inductor oscillates to a peak value is determined, and the control signal is sent to the first switch, so that the first switch is turned on. This implements soft switching of the first switch. After the first switch is turned on, when the current flowing through the PFC inductor is less than a specified current, the totem-pole PFC circuit stops sending the control signal to the first switch. In this case, the totem-pole PFC circuit enters an LC resonance, and duration from oscillation to the current switching period is not less than the specified switching duration, and then the control signal is sent to the second switch, so that the second switch is turned on, and the totem-pole PFC circuit enters a next switching period, to implement zero voltage switching of the second switch.

In an implementation, before the determining duration of a previous switching period of the totem-pole PFC circuit based on the electrical parameter of the PFC inductor, the method further includes: sending the control signal to the second switch; detecting the current value of the current flowing through the PFC inductor; and stopping sending the control signal to the second switch when the current value of the current flowing through the PFC inductor is determined to be negative zero-crossing.

According to a second aspect, an embodiment may further provide an apparatus for controlling a totem-pole PFC circuit, including: the totem-pole PFC circuit, a detection circuit, an input voltage detection unit, an output voltage detection unit, and a control unit. The detection circuit is configured to output an electrical parameter of a PFC inductor of the totem-pole PFC circuit to the control unit; the input voltage detection unit is configured to output a voltage of an alternating current of an input end of the totem-pole PFC circuit to the control unit; the output voltage detection unit is configured to output a voltage of a direct current of an output end of the totem-pole PFC circuit to the control unit; and the control unit is configured to: determine duration of a previous switching period of the totem-pole PFC circuit based on the electrical parameter of the PFC inductor, where the duration of the previous switching period is determined based on duration of previous charging of the PFC inductor and duration of previous discharging of the PFC inductor; and send a control signal to a first switch when the duration of the previous switching period is less than specified switching duration, where the first switch is a switch that enables the PFC inductor to be discharged when the alternating current of the input end of the totem-pole PFC circuit is in a positive half period, and the control signal is used to enable a bootstrap capacitor in a bootstrap circuit coupled to the switch to be discharged.

In an implementation, the control unit is further configured to determine, based on a current value that is of the PFC inductor and that is input by a third port, a time point at which a current value of a current previously flowing through the PFC inductor decreases from a first threshold to zero and a time point at which the current value of the current previously flowing through the PFC inductor rises from zero to the first threshold, to obtain the duration of the previous switching period.

In an implementation, the control unit is further configured to send the control signal to the first switch after a delay of specified threshold duration, where the specified threshold duration is greater than or equal to a difference between the specified switching duration and the previous switching period.

In an implementation, the control unit is further configured to determine, based on the current value that is of the PFC inductor and that is input by the third port, duration of a current switching period of the totem-pole PFC circuit when the current value of the current flowing through the PFC inductor is less than a second threshold.

In an implementation, the control unit is further configured to: stop sending the control signal to the first switch; and send the control signal to a second switch based on the voltage input by the input voltage detection unit and the voltage input by the output voltage detection unit, where the second switch is a switch that enables the PFC inductor to be charged when the alternating current of the input end of the totem-pole PFC circuit is in the positive half period.

In an implementation, the control unit is further configured to: detect an input voltage of the detection circuit when the voltage of the input end of the totem-pole PFC circuit is not greater than a half of the voltage of the output end of the totem-pole PFC circuit, where the input voltage of the detection circuit is a voltage from a high-frequency bridge arm in the totem-pole PFC circuit to a resistor in the detection circuit; and send the control signal to the second switch when the input voltage of the detection circuit is positive zero-crossing.

In an implementation, the control unit is further configured to: detect an input voltage of the detection circuit when the voltage of the input end of the totem-pole PFC circuit is greater than a half of the voltage of the output end of the totem-pole PFC circuit; send the control signal to the first switch when the input voltage of the detection circuit is negative zero-crossing; detect the current value of the current flowing through the PFC inductor; stop sending the control signal to the first switch when the current value of the current flowing through the PFC inductor is determined to be less than the second threshold; and send the control signal to the second switch when the input voltage of the detection circuit is positive zero-crossing.

In an implementation, the control unit is further configured to: send the control signal to the second switch; detect the current value of the current flowing through the PFC inductor; and stop sending the control signal to the second switch when the current value of the current flowing through the PFC inductor is determined to be negative zero-crossing.

According to a third aspect, an embodiment may provide an electronic device, including the apparatus for controlling a totem-pole PFC circuit that may be implemented in the second aspect. The electronic device may be a base station, a charging pile, a switch, an electric vehicle, or the like. This is not limited herein.

BRIEF DESCRIPTION OF DRAWINGS

The following briefly describes the accompanying drawings that may be used in descriptions of embodiments or a conventional technology.

DETAILED DESCRIPTION OF EMBODIMENTS

The following describes the embodiments with reference to the accompanying drawings.

The term "and/or" describes an association relationship between associated objects and represents that three relationships may exist. For example, A and/or B may represent the following three cases: only A exists, both A and B exist, and only B exists. The character "/" indicates an "or" relationship between the associated objects. For example, A/B indicates A or B.

The terms "first", "second", and the like are intended to distinguish between different objects, but do not indicate a particular order of the objects. For example, a first response message, a second response message, and the like are used to distinguish between different response messages, but do not indicate a particular order of the response messages.

In the embodiments, the words "example" or "for example" are used to represent giving an example, an illustration, or a description. Any embodiment described as an "example" or "for example" in the embodiments should not be explained as being more preferred or having more advantages than another embodiment. Using the word "example" or "for example" or the like may be intended to present a relative concept.

In the descriptions of embodiments, unless otherwise specified, "a plurality of" means two or more. For example, a plurality of processing units are two or more processing units, and a plurality of elements are two or more elements.

Figure 1:
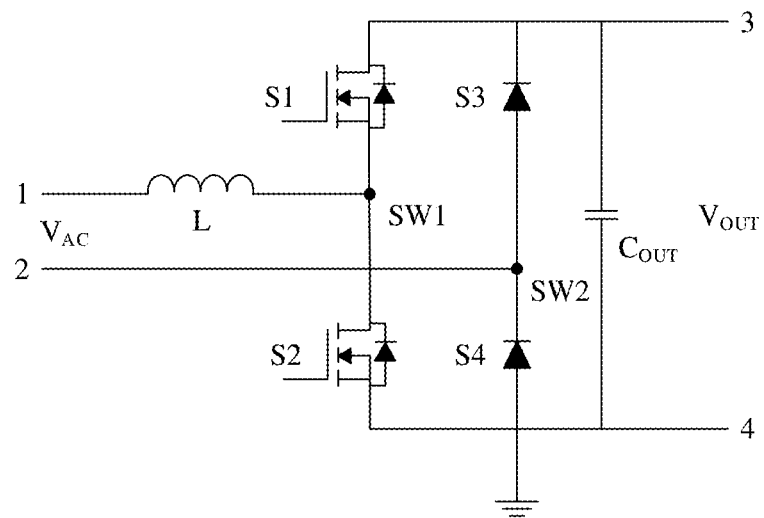
FIG. 1 is a schematic diagram of a structure of a totem-pole PFC circuit in the conventional technology.

FIG. 1 is a schematic diagram of a structure of a totem-pole PFC circuit in the conventional technology. As shown in FIG. 1, the totem-pole PFC circuit includes an input end 1, an input end 2, a PFC inductor L, a switch S1, a switch S2, a switch S3, a switch S4, a filter capacitor $C_{OUT}$, an output end 3, and an output end 4. The input end 1 and the input end 2 may be electrically connected to an external power supply. The output end 3 and the output end 4 may be electrically connected to a plurality of loads. The switch S1 and the switch S2 are connected in series, and the switch S1 and the switch S2 are electrically connected between the output end 3 and the output end 4. The switch S3 and the switch S4 are connected in series, and the switch S3 and the switch S4 are electrically connected between the output end 3 and the output end 4. The filter capacitor $C_{OUT}$ is electrically connected between the output end 3 and the output end 4. The input end 1 is electrically connected to one end of the PFC inductor L, and the other end of the PFC inductor L is electrically connected between the switch S1 and the switch S2. The input end 2 is electrically connected between the switch S3 and the switch S4.

Figure 2A:
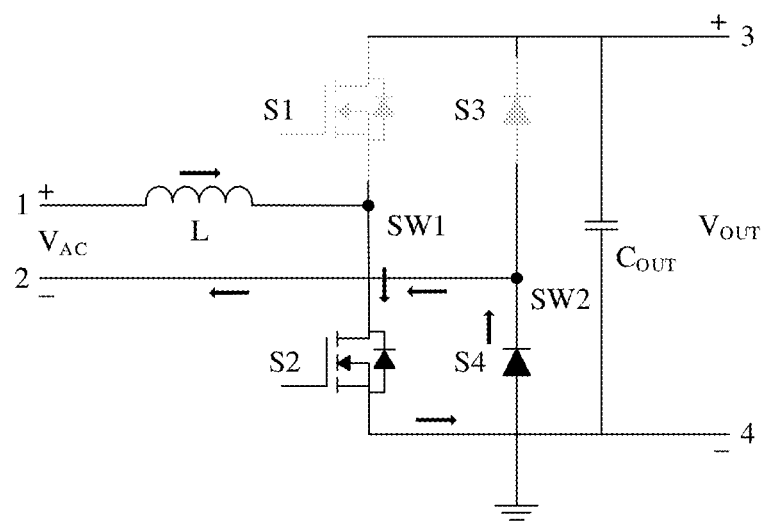
FIG. 2(a) is a schematic diagram of a current flow direction in another totem-pole PFC circuit in the conventional technology.

As shown in FIG. 2(a), an input voltage $V_{AC}$ of the totem-pole PFC circuit is in a positive half period, and $V_{AC}>0$. In other words, the input end 1 is positive, and the input end 2 is negative. In this case, a MOS transistor in the switch S4 is turned on. When the PFC inductor L is charged, the switch S1 in the totem-pole PFC circuit is turned off, and the switch S2 in the totem-pole PFC circuit is turned on. Components for which a current flows in sequence in the totem-pole PFC circuit include: the input end 1→the PFC inductor L→the switch S2→the switch S4→the input end 2.

Figure 2B:
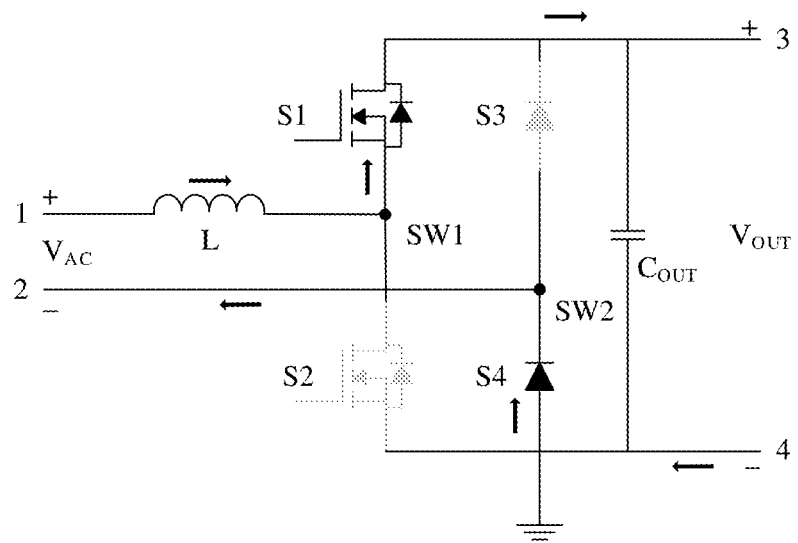
FIG. 2(b) is a schematic diagram of a current flow direction in another totem-pole PFC circuit in the conventional technology.

As shown in FIG. 2(b), an input voltage $V_{AC}$ of the totem-pole PFC circuit is in a positive half period, and $V_{AC}>0$. In other words, the input end 1 is positive, and the input end 2 is negative. In this case, a MOS transistor in the switch S4 is turned on. When the PFC inductor L is discharged, the switch S1 in the totem-pole PFC circuit is turned on, and the switch S2 in the totem-pole PFC circuit is turned off. Components for which a current flows in sequence in the totem-pole PFC circuit include: the input end 1→the PFC inductor L→the switch S1→the output end 3→the output end 4→the switch S4→the input end 2.

Figure 2C:
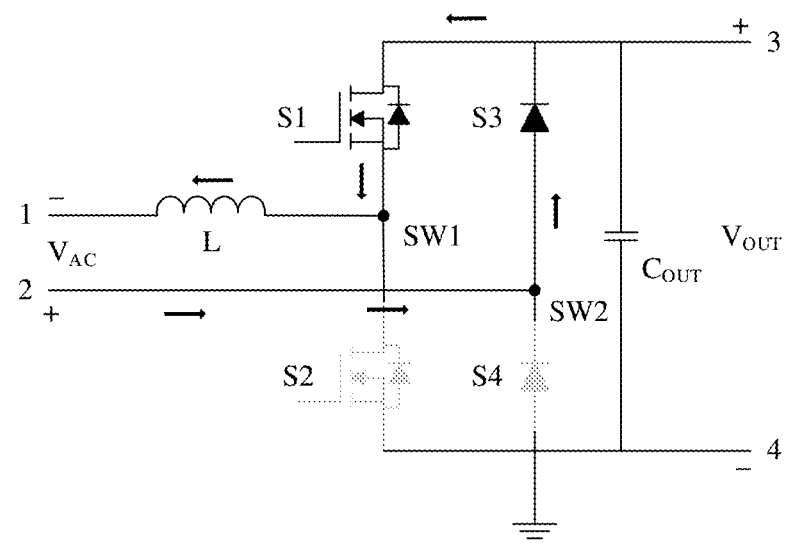
FIG. 2(c) is a schematic diagram of a current flow direction in another totem-pole PFC circuit in the conventional technology.

As shown in FIG. 2(c), an input voltage $V_{AC}$ of the totem-pole PFC circuit is in a negative half period, and $V_{AC}<0$. In other words, the input end 1 is negative, and the input end 2 is positive. In this case, a MOS transistor in the switch S3 is turned on. When the PFC inductor L is charged, the switch S1 in the totem-pole PFC circuit is turned on, and the switch S2 in the totem-pole PFC circuit is turned off. Components for which a current flows in sequence in the totem-pole PFC circuit include: the input end 2→the switch S3→the switch S1→the PFC inductor L→the input end 1.

Figure 2D:
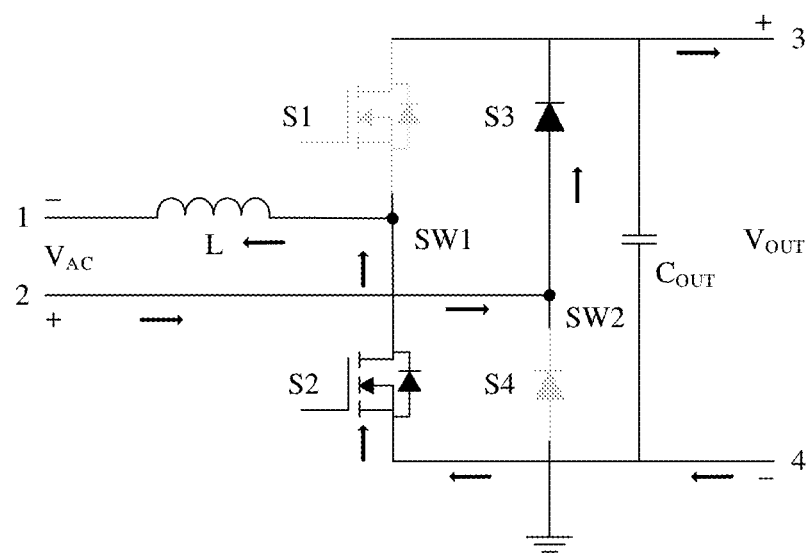
FIG. 2(d) is a schematic diagram of a current flow direction in another totem-pole PFC circuit in the conventional technology.

As shown in FIG. 2(d), an input voltage $V_{AC}$ of the totem-pole PFC circuit is in a negative half period, and $V_{AC}<0$. In other words, the input end 1 is negative, and the input end 2 is positive. In this case, a MOS transistor in the switch S3 is turned on. When the PFC inductor L is discharged, the switch S1 in the totem-pole PFC circuit is turned off, and the switch S2 in the totem-pole PFC circuit is turned on. Components for which a current flows in sequence in the totem-pole PFC circuit include: the input end 2→the switch S3→the output end 3→the output end 4→the switch S2→the PFC inductor L→the input end 1.

An existing totem-pole PFC circuit has a continuous current mode (CCM), a critical conduction mode (CRM), and a discontinuous current mode (DCM). The CCM means that in a switching period, a current of the PFC inductor L in a totem-pole PFC circuit is continuous, and the current of the PFC inductor L does not decrease to 0. The DCM means that in a switching period, a current of the PFC inductor L in the totem-pole PFC circuit is discontinuous, and the current of the PFC inductor L decreases to 0. The CRM is an operating mode that enables the totem-pole PFC circuit to smoothly transit from the CCM to the DCM. In order to improve an operating mode switching efficiency of the totem-pole PFC circuit, a switch in the totem-pole PFC circuit needs to implement zero voltage switching (ZVS).

Figure 3:
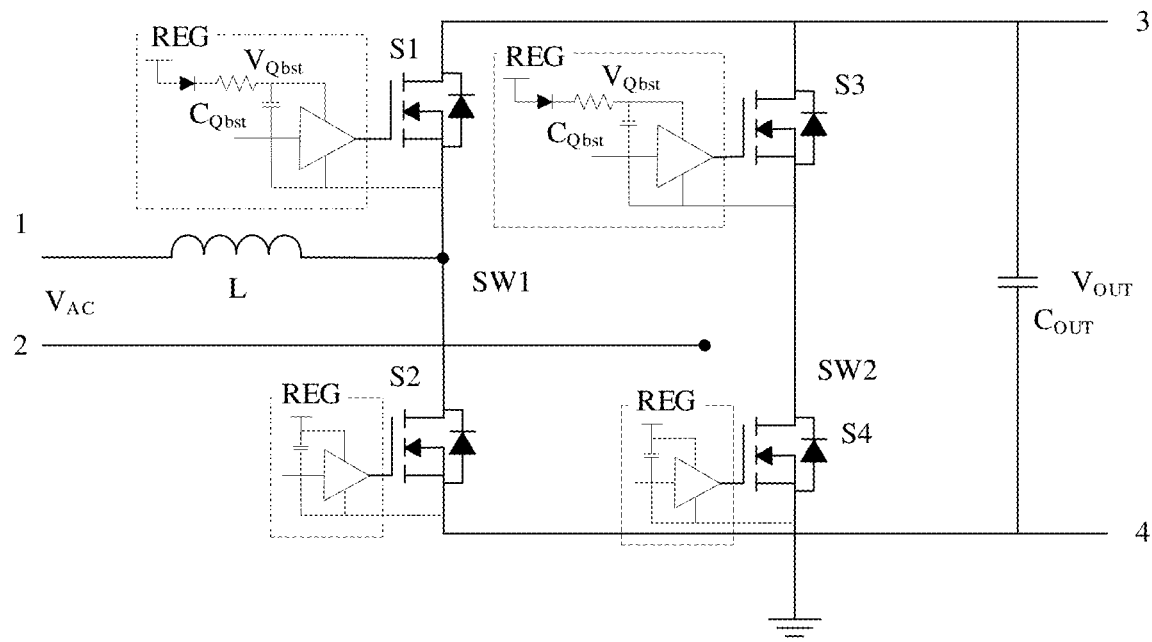
FIG. 3 is a schematic diagram of a structure of another totem-pole PFC circuit in the conventional technology.

FIG. 3 is a schematic diagram of a structure of another totem-pole PFC circuit in the conventional technology. As shown in FIG. 3, on the basis of the totem-pole PFC circuit shown in FIG. 1, gates of the switch S1, the switch S2, the switch S3, and the switch S4 are electrically connected to a bootstrap circuit separately. If the bootstrap circuit inputs an electrical signal to a gate of a switch, the switch is in an on state. If the bootstrap circuit does not input an electrical signal to a gate of a switch, the switch is in an off state.

In the conventional technology, an input voltage $V_{AC}$ of the totem-pole PFC circuit is in the positive half period, and $V_{AC}>0$. In other words, the input end 1 is positive, and the input end 2 is negative. If a voltage value between the input voltage $V_{AC}$ and an output voltage $V_{OUT}$ satisfies a condition that $V_{AC}>0.5\ V_{OUT}$, the totem-pole PFC circuit is in the DCM. In this case, a relationship between a current $i_L$ that flows through the PFC inductor L in the totem-pole PFC circuit, a voltage $V_{SW1}$ at a node SW1, a relationship between a conduction state of the switch S1 and a conduction state of the switch S2 that change with time is shown in FIG. 4.

Figure 4:
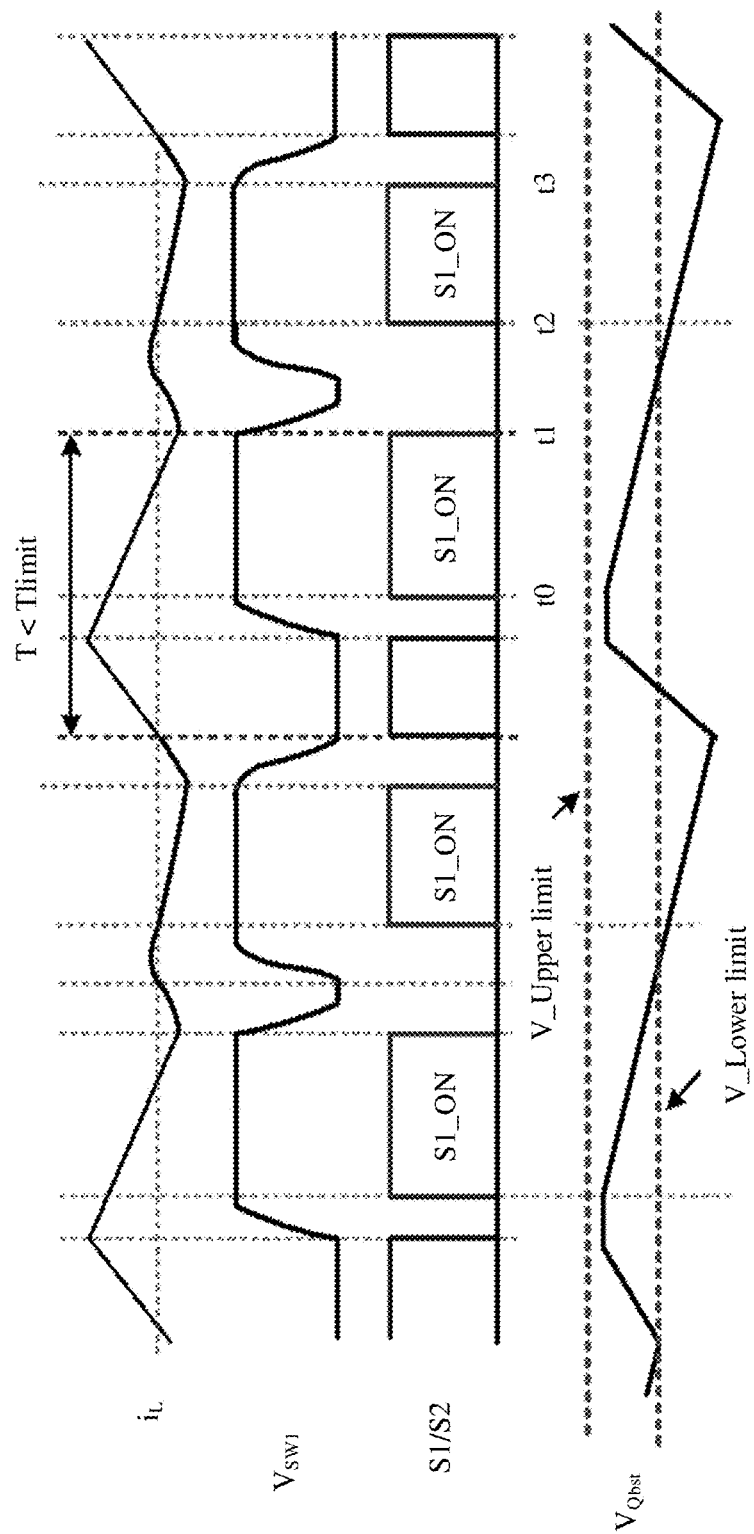
FIG. 4 is a simulation diagram of time-varying electrical parameters of a totem-pole PFC circuit in a DCM operating mode in the conventional technology.

As shown in FIG. 4, at a time point t0, the switch S1 in the totem-pole PFC circuit is turned off. When duration T of a switching period of the totem-pole PFC circuit is less than duration Tmin of a specified switching period, that is, after a switching frequency of a current switching period is greater than a maximum switching frequency, the switch S1 in the totem-pole PFC circuit needs to be turned on, so that the PFC inductor L is completely discharged. At a time period from a time point t0 to a time point t1, the switch S1 in the totem-pole PFC circuit is turned on. At a time point t1, when a resonance of the voltage $V_{SW1}$ at the node SW1 reaches a peak value, the switch S1 is turned off again. A time period in which the switch S1 is turned on again is from t2 to t3. If the voltage $V_{SW1}$ at the node SW1 can be resonant to 0 V, the switch S2 implements the ZVS when the totem-pole PFC circuit is in the DCM.

In the conventional technology, the input voltage $V_{AC}$ of the totem-pole PFC circuit is in the positive half period, and the switch S1 needs to be turned on twice. Each time the switch S1 is turned on, electricity of a bootstrap capacitor $C_{Qbst}$ in a bootstrap circuit is consumed. If the switch S1 is turned on for a plurality of times, the bootstrap capacitor $C_{Qbst}$ and a bootstrap voltage $V_{Qbst}$ in the bootstrap circuit are continuously attenuated, and more electricity of the bootstrap capacitor $C_{Qbst}$ is consumed. In order to meet a requirement that the electricity of the bootstrap capacitor $C_{Qbst}$ enables the switch S1 to be turned on twice, a capacitance value of the bootstrap capacitor may be increased. If the capacitance value of the capacitor is increased, circuit costs are increased. The capacitance value of the capacitor is increased, and consequently a volume of the capacitor is large. This is not conducive to miniaturization of a device installed with the totem-pole PFC circuit.

To resolve a disadvantage of the existing totem-pole PFC circuit, the embodiments may use a totem-pole PFC circuit and a totem-pole PFC circuit control method. In a process of performing switching conversion by the totem-pole PFC circuit in this switching period, when an input voltage $V_{AC}$ of the totem-pole PFC circuit is in a positive half period, duration (such as a switching frequency) of a previous switching period is first obtained, and whether the duration of the previous switching period is greater than specified switching duration is determined. If the duration of the previous switching period is less than the specified switching duration, in this switching period, a switch that enables a PFC inductor L to be discharged is delayed for specified threshold duration, and after the PFC inductor is fully charged, the switch that enables the PFC inductor to be discharged is turned on, so that the switch that enables the PFC inductor L to be discharged is turned on only once in a switching period. In the embodiments, in a switching period, a switch S1 cancels the switch to be turned on for the first time, and reserves the switch to be turned on for the second time, so that power consumption of a bootstrap capacitor $C_{Qbst}$ in a bootstrap circuit connected to a gate of the switch S1 can be reduced, and the totem-pole PFC circuit implements full input range ZVS. The totem-pole PFC circuit in the embodiments may be applied to a device with a small volume. This increases an application scenario of the totem-pole PFC circuit.

Figure 5:
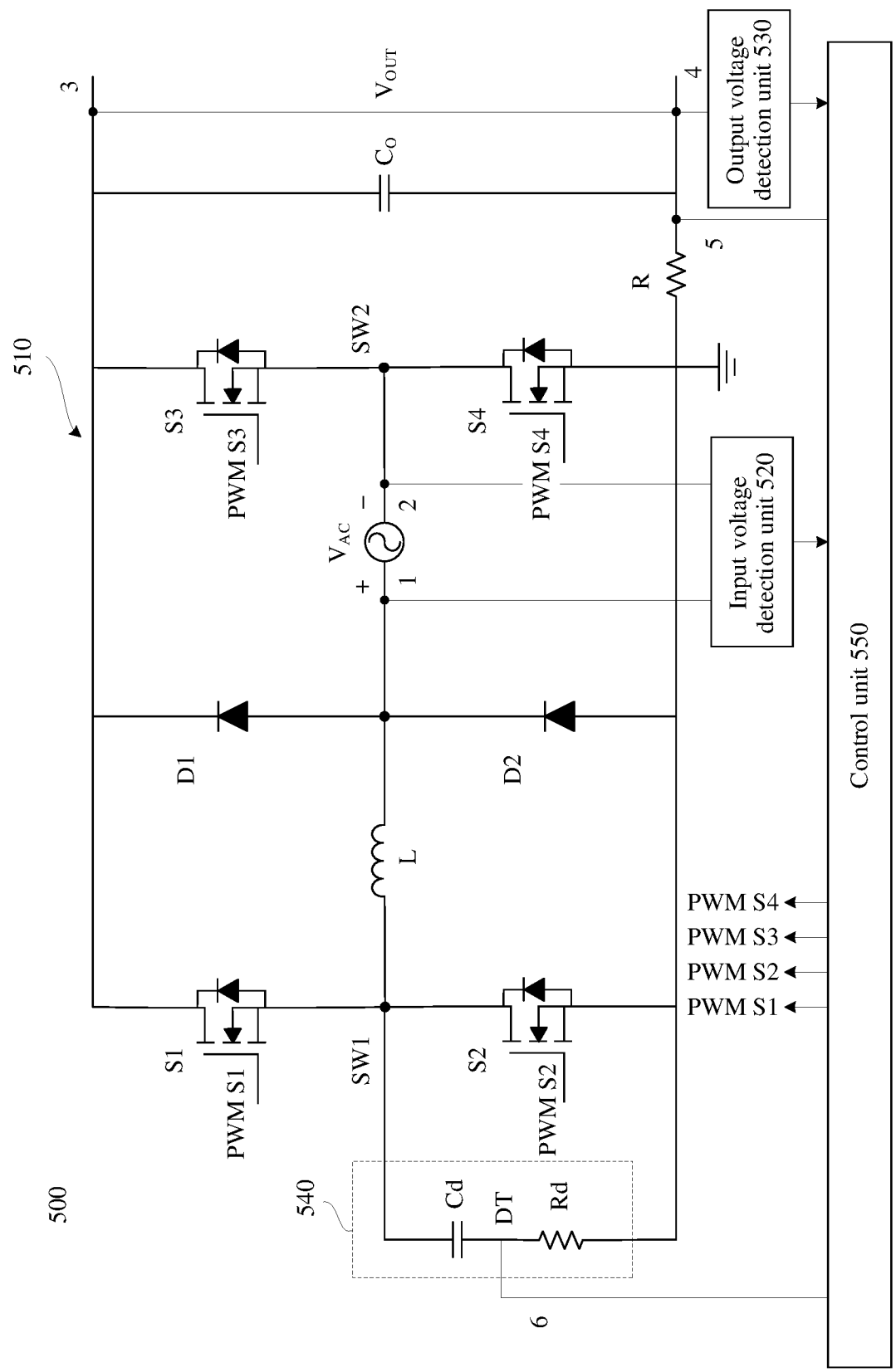
FIG. 5 is a schematic diagram of a structure of an apparatus for controlling a totem-pole PFC circuit according to an embodiment.

FIG. 5 is a schematic diagram of a structure of an apparatus for controlling a totem-pole PFC circuit according to an embodiment. As shown in FIG. 5, an apparatus 500 for controlling a totem-pole PFC circuit includes a totem-pole PFC circuit 510, an input voltage detection unit 520, an output voltage detection unit 530, a detection circuit 540, and a control unit 550. The totem-pole PFC circuit 510 is configured to convert an input alternating current into a direct current. The input voltage detection unit 520 is coupled to an input end of the totem-pole PFC circuit 510 and is configured to detect a voltage value of a voltage $V_{AC}$ input by the totem-pole PFC circuit 510 and send a detection result to the control unit 550. The output voltage detection unit 530 is coupled with an output end of the totem-pole PFC circuit 510 and is configured to detect a voltage value of a voltage $V_{OUT}$ output by the totem-pole PFC circuit 510 and send a detection result to the control unit 550. An input end of the detection circuit 540 is electrically connected to the totem-pole PFC circuit 510, and an output end of the detection circuit 540 is electrically connected to the control unit 550 and is configured to send a voltage value at a node SW1 in the totem-pole PFC circuit 510 to the control unit 550. An output end of the control unit 550 is electrically connected to each switch in the totem-pole PFC circuit 510, and is configured to: generate a control signal based on the detection result of the input voltage detection unit 520, the detection result of the output voltage detection unit 530, the voltage value, at the node SW1, input by the detection circuit 540, and a current value of a resistor R, and send the control signal to each switch in the totem-pole PFC circuit 510.

As shown in FIG. 5, the totem-pole PFC circuit 510 includes an input end 1, an input end 2, a switch S1, a switch S2, a switch S3, a switch S4, a diode D1, a diode D2, a PFC inductor L, the resistor R, a filter capacitor $C_{OUT}$, an output end 3, and an output end 4. The input end 1 and the input end 2 may be electrically connected to an external power supply and receive an electrical signal input by the external power supply. The input end 1 and the input end 2 may be further electrically connected to the input voltage detection unit 520. The input voltage detection unit 520 may detect a voltage value of the input voltage $V_{AC}$ through the input end 1 and the input end 2. The switch S1 and the switch S2 are connected in series, and the switch S1 and the switch S2 are electrically connected between the output end 3 and the output end 4. The switch S3 and the switch S4 are connected in series, and the switch S3 and the switch S4 are electrically connected between the output end 3 and the output end 4. The diode D1 and the diode D2 are connected in series, and the diode D1 and the diode D2 are electrically connected between the output end 3 and the output end 4. The filter capacitor $C_{OUT}$ is electrically connected between the output end 3 and the output end 4. The input end 1 is electrically connected to a node between the diode D1 and the diode D2. The input end 2 is electrically connected to a node SW2 between the switch S3 and the switch S4. One end of the PFC inductor L is electrically connected to the node between the diode D1 and the diode D2, and the other end is electrically connected to the node SW1 between the switch S1 and the switch S2. The PFC inductor L may cooperate with another element to reduce a phase difference between a fundamental current and a voltage of an alternating current input and has functions of a rectifier and a filter. The output end 3 and the output end 4 may be electrically connected to a plurality of loads and provide electric energy for each load. The output end 3 and the output end 4 may be further electrically connected to the output voltage detection unit 530. The output voltage detection unit 530 may detect a voltage value of the input voltage $V_{OUT}$ through the output end 3 and the output end 4.

The totem-pole PFC circuit may not be limited to the structure shown in FIG. 5 and may be another totem-pole PFC circuit. The embodiments may be described as an example herein and is not limited thereto.

The switch S1, the switch S2, the switch S3, and the switch S4 may use components such as a metal-oxide-semiconductor field-effect transistor (MOSFET), an insulated gate bipolar transistor (IGBT), and a diode as switches. A MOS transistor is used as an example, and a bootstrap circuit (not shown in the figure) of a gate of each MOS transistor is electrically connected. The output end of the control unit 550 is electrically connected to the bootstrap circuit. The control unit 550 may send a pulse width modulation (PWM) signal to the bootstrap circuit, to enable a bootstrap capacitor in the bootstrap circuit to be discharged and enable the gate of the MOS transistor to input a current, so as to enable the MOS transistor to be in an on state. In the embodiments, the switch S1, the switch S2, the switch S3, and the switch S4 each include a MOS transistor and a diode. One end of the diode is electrically connected to a source of the MOS transistor, and the other end of the diode is electrically connected to a drain of the MOS transistor. A current flowing direction of the MOS transistor is opposite to a current flowing direction of the diode.

As shown in FIG. 5, in the switch S1, a current flowing direction of the diode is "the input end 1→the switch S1", and a current flowing direction of the MOS transistor is "the switch S1→the input end 1". In the switch S2, a current flow direction of the diode is "the switch S2→the input end 1", and a current flow direction of the MOS transistor is "the input end 1→the switch S2". In the switch S3, a current flow direction of the diode is "the input end 2→the switch S3", and a current flow direction of the MOS transistor is "the switch S3→the input end 2". In the switch S4, a current flow direction of the diode is "the switch S4→the input end 2", and a current flow direction of the MOS transistor is "the input end 2→the switch S4".

The control unit 550 may separately control the MOS transistors in the switch S1, the switch S2, the switch S3, and the switch S4 to be in a turned-on or turned-off state, so that the totem-pole PFC circuit 510 can implement four operating modes similar to those shown in FIG. 2(*a*) to FIG. 2(*d*). Details are as follows.

In an embodiment, an input voltage $V_{AC}$ of the totem-pole PFC circuit is in a positive half period, and $V_{AC}>0$. In other words, the input end 1 is positive, and the input end 2 is negative. In this case, the MOS transistor in the switch S4 is turned on. When the PFC inductor L is charged, the MOS transistor in the switch S1 is turned off, and the MOS transistor in the switch S2 is turned on. Components for which a current flows in sequence in the totem-pole PFC circuit 510 include: the input end 1→the PFC inductor L→the switch S2→the switch S4→the input end 2.

In an embodiment, an input voltage $V_{AC}$ of the totem-pole PFC circuit is in a positive half period, and $V_{AC}>0$. In other words, the input end 1 is positive, and the input end 2 is negative. In this case, the MOS transistor in the switch S4 is turned on. When the PFC inductor L is discharged, the MOS transistor in the switch S1 is turned on, and the MOS transistor in the switch S2 is turned off. Components for which a current flows in sequence in the totem-pole PFC circuit 510 include: the input end 1→the PFC inductor L→the switch S1→the output end 3→the output end 4→the switch S4→the input end 2.

In an embodiment, an input voltage $V_{AC}$ of the totem-pole PFC circuit is in a negative half period, and $V_{AC}<0$. In other words, the input end 1 is negative. In this case, the MOS transistor in the switch S3 is turned on. When the PFC inductor L is charged, the MOS transistor in the switch S1 is turned on, and the MOS transistor in the switch S2 is turned off. Components for which a current flows in sequence in the totem-pole PFC circuit 510 include: the input end 2→the switch S3→the switch S1→the PFC inductor L→the input end 1.

In an embodiment, an input voltage $V_{AC}$ of the totem-pole PFC circuit is in a negative half period, and $V_{AC}<0$. In other words, the input end 1 is negative. In this case, the MOS transistor in the switch S3 is turned on. When the PFC inductor L is discharged, the switch S1 in the totem-pole PFC circuit is turned off, and the switch S2 in the totem-pole PFC circuit is turned on. Components for which a current flows in sequence in the totem-pole PFC circuit include: the input end 2→the switch S3→the output end 3→the output end 4→the switch S2→the PFC inductor L→the input end 1.

As shown in FIG. 5, the resistor R in the totem-pole PFC circuit 510 is electrically connected between a branch circuit in which the switch S3 is located and a branch circuit in which the filter capacitor $C_{OUT}$ is located. An output end 5 is disposed between the resistor R and the output end 4, and the output end 5 is electrically connected to the control unit 550. The control unit 550 may receive a current $i_R$ passing through the resistor R through the output 5. Because the resistor R and the PFC inductor L may be in a same loop, the current $i_R$ passing through the resistor R is basically the same as a current $i_L$ passing through the PFC inductor L. Therefore, the control unit 550 receives the current $i_R$ passing through the resistor R, and may obtain the current $i_L$ passing through the PFC inductor L.

The detection circuit 540 includes a detection capacitor Cd and a detection resistor Rd. The detection capacitor Cd and the detection resistor Rd are connected in series, a branch circuit in which the detection capacitor Cd and the detection resistor Rd are located is connected in parallel to the switch S2, and one end of the branch circuit in which the detection capacitor Cd and the detection resistor Rd are located is electrically connected to the node SW1. An output end 6 is disposed on a node DT between the detection capacitor Cd and the detection resistor Rd, and the output end 6 is electrically connected to the control unit 550. In charging and discharging processes of the detection capacitor Cd, a voltage $V_{DT}$ of the capacitor Cd is equal to a voltage $V_{SW1}$ at the node SW1. After receiving the voltage $V_{DT}$ of the capacitor Cd through the output end 6, the control unit 550 may obtain the voltage $V_{SW1}$ at the node SW1.

In this embodiment, "the switch S1 is turned on" mentioned below means that the MOS transistor in the switch S1 is turned on, and "the switch S1 is turned off" means that the MOS transistor in the switch S1 is turned off. The same rule applies to other switches.

Figure 6:
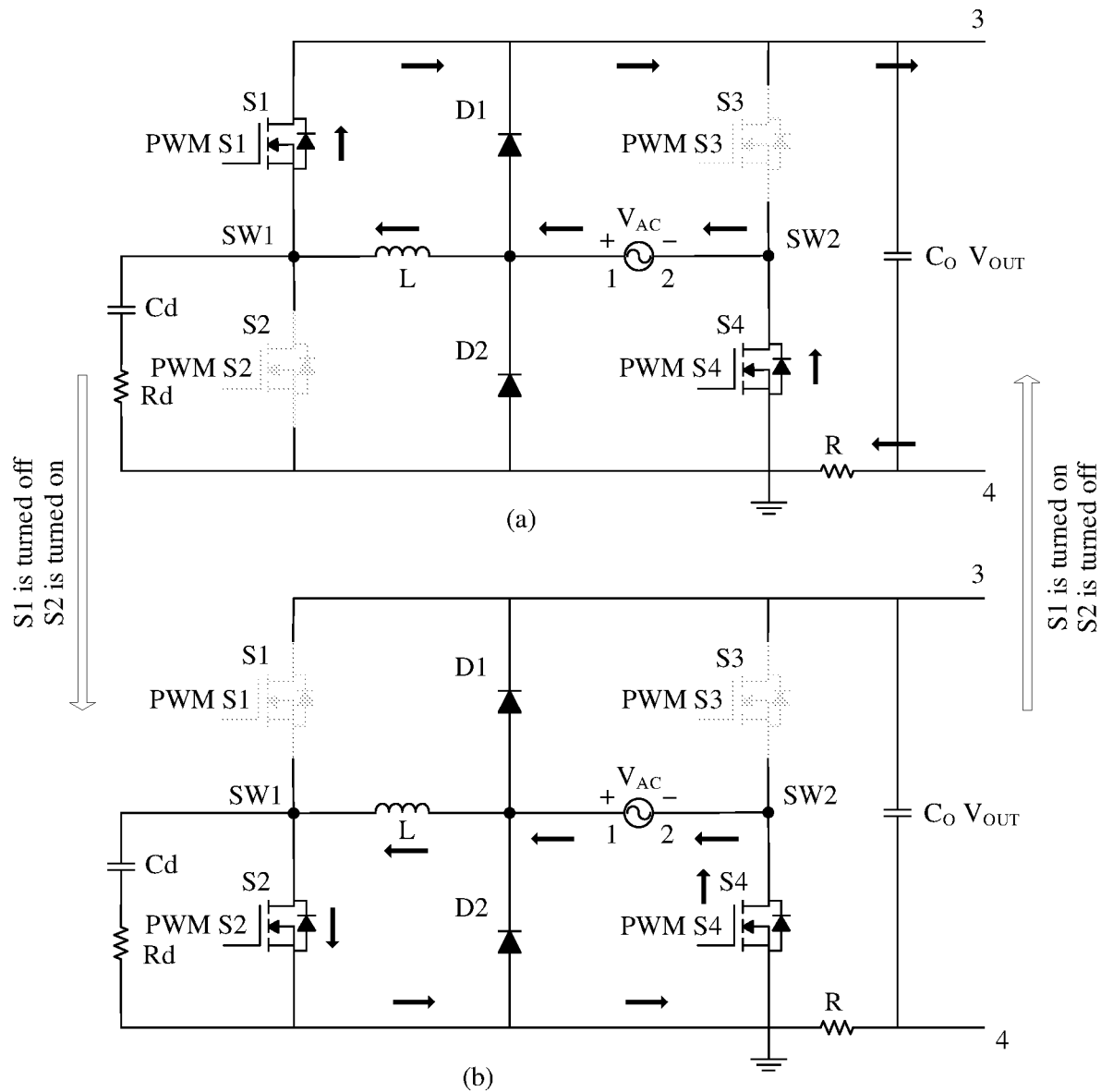
FIG. 6 is a schematic circuit diagram of mutual conversion between charging and discharging of a PFC inductor when an input voltage $V_{AC}$ of a totem-pole PFC circuit is in a positive half period according to an embodiment.

FIG. 6 is a schematic circuit diagram of mutual conversion between charging and discharging of a PFC inductor when an input voltage $V_{AC}$ of a totem-pole PFC circuit is in a positive half period according to an embodiment. As shown in FIG. 6, when the input voltage $V_{AC}$ of the totem-pole PFC circuit 510 is in the positive half period. In other words, the input end 1 is positive, and the input end 2 is negative. In this case, the switch S4 is always in an on state.

As shown in FIG. 6(*a*), in a discharge process of the PFC inductor L, a switch S1 in the totem-pole PFC circuit is turned on, and a switch S2 in the totem-pole PFC circuit is turned off. Components for which a current flows in sequence in the totem-pole PFC circuit 510 include: the input end 1→the PFC inductor L→the switch S1→the output end 3→the output end 4→the switch S4→the input end 2. In this case, the current $i_L$ that the PFC inductor L passes through is reversely discharged, and the current $i_R$ sampled at the resistor R changes with the current $i_L$ of the PFC inductor L in the discharging process.

As shown in FIG. 6(*b*), in a charging process of the PFC inductor, the switch S1 in the totem-pole PFC circuit is turned off, and the switch S2 in the totem-pole PFC circuit is turned on. Components for which a current flows in sequence in the totem-pole PFC circuit 510 include: the input end 1→the PFC inductor L→the switch S2→the switch S4→the input end 2. In this case, the current $i_L$ flowing through the PFC inductor L is charged forward, and the current $i_R$ sampled at the resistor R changes with the current $i_L$ of the PFC inductor L in the charging process.

Ton is used to represent charging duration of the PFC inductor L, Toff is used to represent duration corresponding to a case in which the current $i_L$ decreases from a peak value to 0 A in the discharging process of the PFC inductor L, and Tmin is used to represent duration corresponding to a case in which the PFC inductor L performs complete charging and discharging at a maximum switching frequency. The control unit 550 may determine an operating mode of the totem-pole PFC circuit 510 based on a relationship between Ton+Toff and Tmin. If Ton+Toff>Tmin, the totem-pole PFC circuit 510 enters a CRM operating mode. In this case, the control unit 550 may directly send a PWM S1 signal to the switch S1, so that the switch S1 is in a turn-on state. If Ton+Toff<Tmin, the totem-pole PFC circuit 510 enters a DCM operating mode. In this case, a switching frequency in a current switching period of the totem-pole PFC circuit 510 is greater than the maximum switching frequency, and the control unit 550 sends a PWM S1 signal to the switch S1 after a delay of specified threshold duration, so that the switch S1 is in a turn-on state. In a switching period, the control unit 550 sends the PWM S1 signal to the switch S1 only once, so that the switch S1 is turned on once. This reduces power consumption of the bootstrap capacitor $C_{Qbst}$ in the bootstrap circuit. The delayed specified threshold duration is a difference between the duration of the current switching period and specified switching duration. I an embodiment, the delayed specified threshold duration may be greater than or equal to the difference between the duration of the current switching period and the specified switching duration.

When determining that the totem-pole PFC circuit 510 enters the CRM operating mode, the control unit 550 sends the PWM S1 signal to the switch S1, so that the switch S1 is in an on state. In this case, in the totem-pole PFC circuit 510, a relationship among a conduction state of the switch S1, the current $i_R$ at the resistor R, the voltage $V_{SW1}$ at the node SW1, the voltage $V_{DT}$ at the node DT, and a conduction state of the switch S2 that change with time is shown in FIG. 7.

Figure 7:
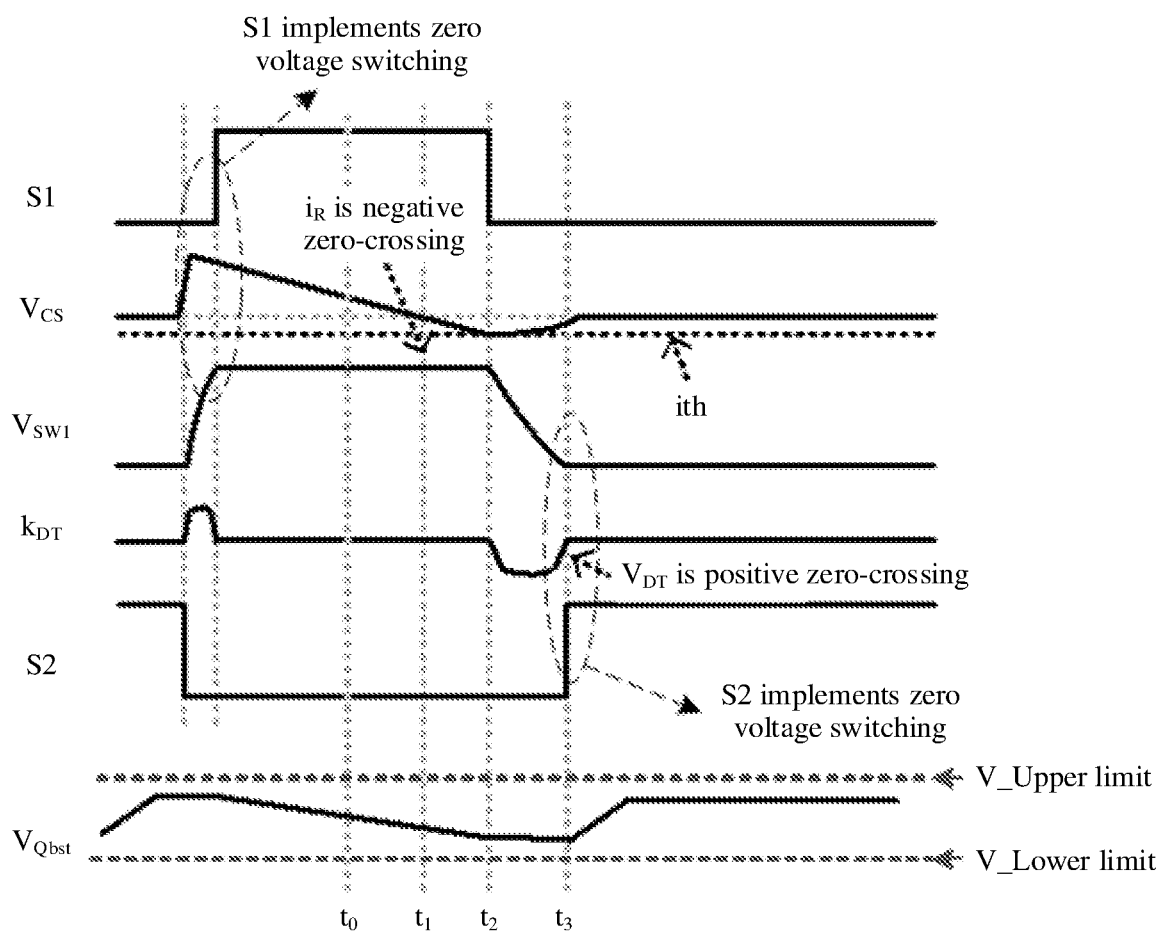
FIG. 7 is a simulation diagram of time-varying electrical parameters when a totem-pole PFC circuit enters a CRM operating mode according to an embodiment.

As shown in FIG. 7, the control unit 550 receives an input voltage $V_{AC}$ input by the input voltage detection unit 520, an output voltage $V_{OUT}$ input by the output voltage detection unit 530, a voltage $V_{DT}$ input by the detection circuit 540, and a current $i_R$ input by the input end 5. At a time point t1, because a switching frequency in a current switching period of the totem-pole PFC circuit 510 is less than a maximum switching frequency, the control unit 550 continues to detect the current $i_R$ input by the input end 5.

At a time point t2, the control unit 550 receives the current $i_R$ that is of the resistor R and that is input at the input end 5, and determines a current $i_L$ that passes through the PFC inductor L. If the control unit 550 detects that the current $i_L$ passing through the PFC inductor L is less than a specified current −ith, the PFC inductor stops sending the PWM S1 signal to the switch S1, so that the switch S1 is in an off state. If the control unit 550 detects that the current $i_L$ passing through the PFC inductor L is not less than the specified current −ith, the control unit 550 continues to detect the current $i_R$. A value of the specified current ith needs to be at least greater than a sum of currents of charging and discharging performed by a parasitic capacitor of the switch S1 and a parasitic capacitor of the switch S2.

After receiving the voltage $V_{DT}$ input by the detection circuit 540, the control unit 550 determines the voltage $V_{SW1}$ at the node SW1. If the control unit 550 detects that the voltage value at the node SW1 is 0 V, or the control unit 550 detects that the current of the PFC inductor L is 0 A, both energy on the PFC inductor L and energy of a capacitor in the MOS transistor are fed back to an input side, that is, the input end 1. In this case, a voltage value between the input end 1 and the input end 2 may be considered as a fixed value, and it can be understood according to the law of energy conservation that:

$$\frac{1}{2}i_L^2 L + C_{OSS} V_{OUT}^2 = V_{AC} \cdot \int_{t_0}^{t} (i_{S1} + i_{S2}) dt = 2C_{OSS} \cdot V_{OUT} \cdot V_{AC} \quad (1)$$

$V_{AC}$ is an input voltage, $V_{OUT}$ is an output voltage, $C_{OSS}$ is a sum of a parasitic capacitor of the switch S1 and a parasitic capacitor of the switch S2, $i_L$ is a current of the PFC inductor L, $i_{S1}$ is a current of the switch S1, and $i_{S2}$ is a current of the switch S2.

The current $i_L$ of the PFC inductor L is obtained by converting the formula (1):

$$i_L^2 = \frac{2C_{OSS} \cdot V_O \cdot (2V_{AC} - V_O)}{L} \quad (2)$$

According to formula (2), and when $$i_L^2 > \frac{2C_{OSS} \cdot V_O \cdot (2V_{AC} - V_O)}{L},$$

a requirement of soft switching may be met. When $V_{AC} < V_{OUT}/2$, an inequality is always true. When $$V_{AC} > V_{OUT}/2, i_L > \sqrt{\frac{2C_{OSS} \cdot V_{OUT} \cdot (2V_{AC} - V_{OUT})}{L}}.$$

When $V_{AC} = V_{OUT}$, $i_L$ may obtain a maximum value. Therefore, the specified current ith should satisfy:

$$ith = \sqrt{\frac{2C_{OSS}}{L}} \cdot V_{AC} \quad (3)$$

Therefore, at the time point t2, if the current $i_L$ of the PFC inductor L is less than the specified current −ith, the control unit 550 stops sending the PWM S1 signal to the switch S1, so that the switch S1 is in an off state. After a parasitic capacitor of the PFC inductor L and the parasitic capacitor of the switch S2 enter a resonance process, the voltage $V_{SW1}$ at the node SW1 decreases with the parasitic capacitor of the switch S2 being discharged.

At a time point t3, after the parasitic capacitor of the switch S2 completes discharging, the voltage $V_{SW1}$ at the node SW1 decreases from $V_{OUT}$ to 0 V. The control unit 550 determines, based on that the detection circuit 540 detects that the voltage $V_{SW1}$ at the node SW1 jumps, a slope $k=dV_{SW1}/dt$ of a jump voltage. The control unit 550 may calculate, based on the slope k of the jump voltage at the node SW1, a current generated on the detection capacitor Cd, where the current is id=Cd·k. After a current flowing through the resistor Rd is id, the voltage $V_{DT}$ is generated at the node DT, that is, $V_{DT}$=id·Rd. When detecting that the voltage $V_{SW1}$ at the node SW1 decreases to 0 V, the control unit 550 may determine that the voltage $V_{DT}$ at the node DT is positive zero-crossing. That is, the voltage $V_{DT}$ at the node DT changes from a negative value to a positive value. Therefore, the control unit 550 receives the voltage value of the input voltage $V_{DT}$ of the detection circuit 550 and may determine that the voltage at the node SW1 is positive zero-crossing and sends a PWM S2 signal to the switch S2, so that the switch S2 is in a turn-on state. This implements zero voltage switching of the switch S2.

Compared with the simulation result shown in FIG. 4, when the input voltage $V_{AC}$ of the totem-pole PFC circuit is in a positive half period, the bootstrap circuit in the apparatus 500 for controlling the totem-pole PFC circuit may need to turn on the switch S1 only once, the bootstrap voltage $V_{Qbst}$ in the bootstrap circuit fluctuates slightly, and a small amount of electricity of the bootstrap capacitor C is consumed. Therefore, the bootstrap capacitor in the bootstrap circuit may be small. This can reduce circuit costs and also facilitate miniaturization of a device installed with the totem-pole PFC circuit.

When determining that the totem-pole PFC circuit 510 enters the DCM operating mode, the control unit 550 does not send a PWM S1 signal to the switch S1 because a switching frequency in a current switching period of the totem-pole PFC circuit 510 is greater than a maximum switching frequency, so that the switch S1 is in an off state. In this case, the totem-pole PFC circuit 510 enters an LC resonance, and the current $i_L$ that the PFC inductor L passes through is reversely discharged. The control unit 550 determines duration T of the current switching period based on the charging and discharging duration Ton+Toff of the PFC inductor L. If the control unit 550 determines that the duration T of the current switching period is greater than or equal to duration Tmin for the PFC inductor L to perform one complete charging and discharging under the limitation of the maximum switching frequency, it is necessary to determine whether the input voltage $V_{AC}$ is greater than a half of the output voltage $V_{OUT}$, and implement zero voltage switching of the switch S2 in different manners based on different results. Details are as follows.

Figure 8:
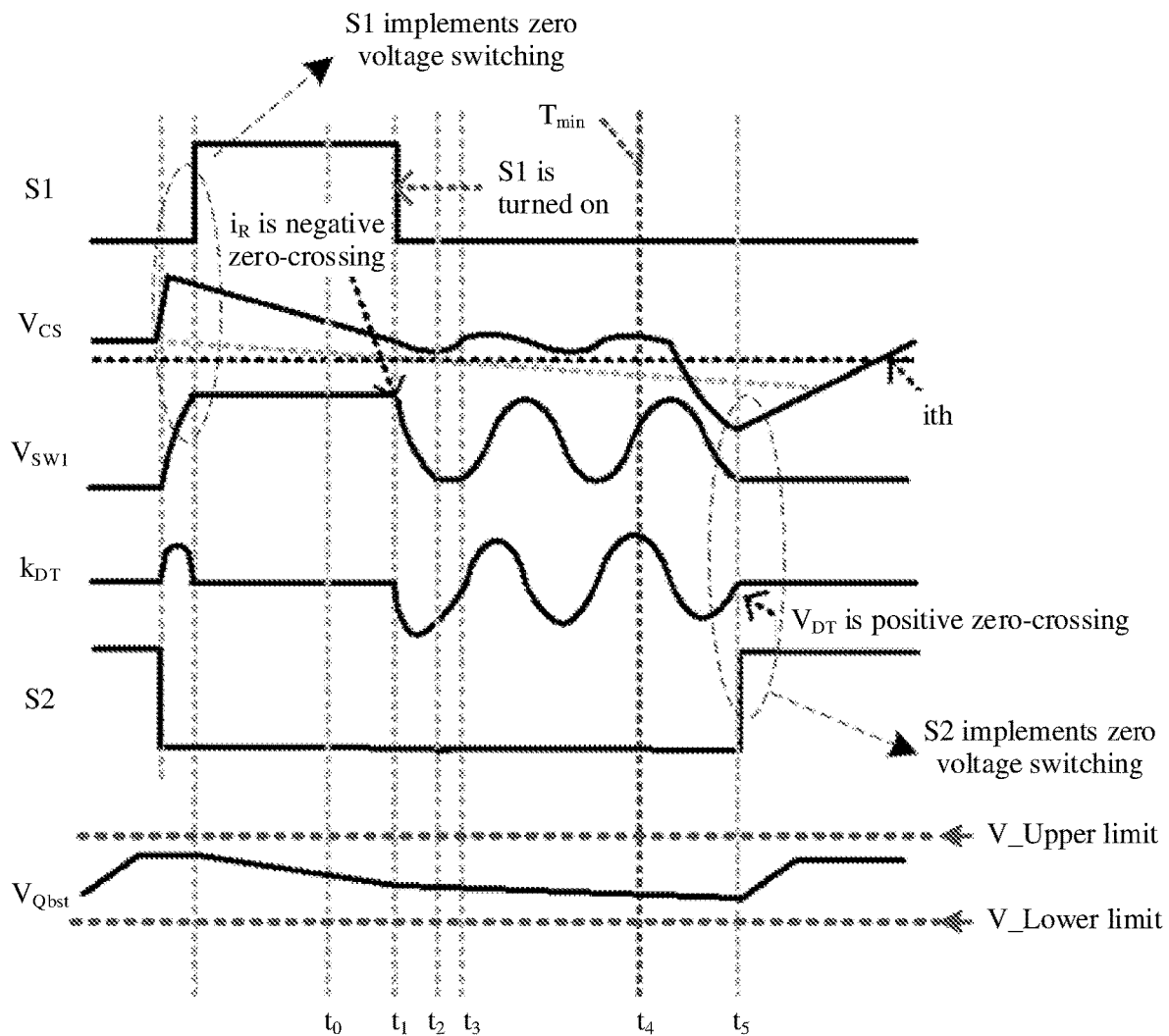
FIG. 8 is a simulation diagram of time-varying electrical parameters when a totem-pole PFC circuit enters a DCM operating mode according to an embodiment.

As shown in FIG. 8, when $V_{AC}$<0.5 $V_{OUT}$, a valley value 2 $V_{AC}$−$V_{OUT}$ of the voltage $V_{SW1}$ at the node SW1 is lower than 0 V. At the time point t2, the voltage $V_{SW1}$ at the node SW1 is reduced to 0 V. Because a voltage of a body diode of the switch S2 is clamped, the voltage $V_{SW1}$ at the node SW1 is always 0 V at a time period from a time point t2 to a time point t3. In this case, the charging and discharging duration T of the PFC inductor L in the totem-pole PFC circuit 510 does not satisfy T≥Tmin; in this case, the control unit 550 does not send the PWM S2 signal to the switch S2.

When the current $i_R$ in the totem-pole PFC circuit 510 oscillates to a time point t4, after the duration T of the current switching period of the totem-pole PFC circuit 510 is greater than or equal to Tmin, a switching frequency of the current switching period of the totem-pole PFC circuit 510 is less than the maximum switching frequency, and meets a limitation of the maximum switching frequency. At a time point t5, when detecting that the voltage $V_{DT}$ at the node DT is positive zero-crossing, the control unit 550 determines that the voltage $V_{SW1}$ at the node SW1 oscillates to 0 V. The control unit 550 sends the PWM S2 signal to the switch S2, so that the switch S2 is in a turn-on state again, and the totem-pole PFC circuit 510 enters a next switching period, to implement zero voltage switching of the switch S2.

Compared with the simulation result shown in FIG. 4, when the input voltage $V_{AC}$ of the totem-pole PFC circuit is in a positive half period, the bootstrap circuit in the apparatus 500 for controlling the totem-pole PFC circuit may need to turn on the switch S1 only once, the bootstrap voltage $V_{Qbst}$ in the bootstrap circuit fluctuates slightly, and a small amount of electricity of the bootstrap capacitor C is consumed. Therefore, the bootstrap capacitor in the bootstrap circuit may be small. This can reduce circuit costs and also facilitate miniaturization of a device installed with the totem-pole PFC circuit.

Figure 9:
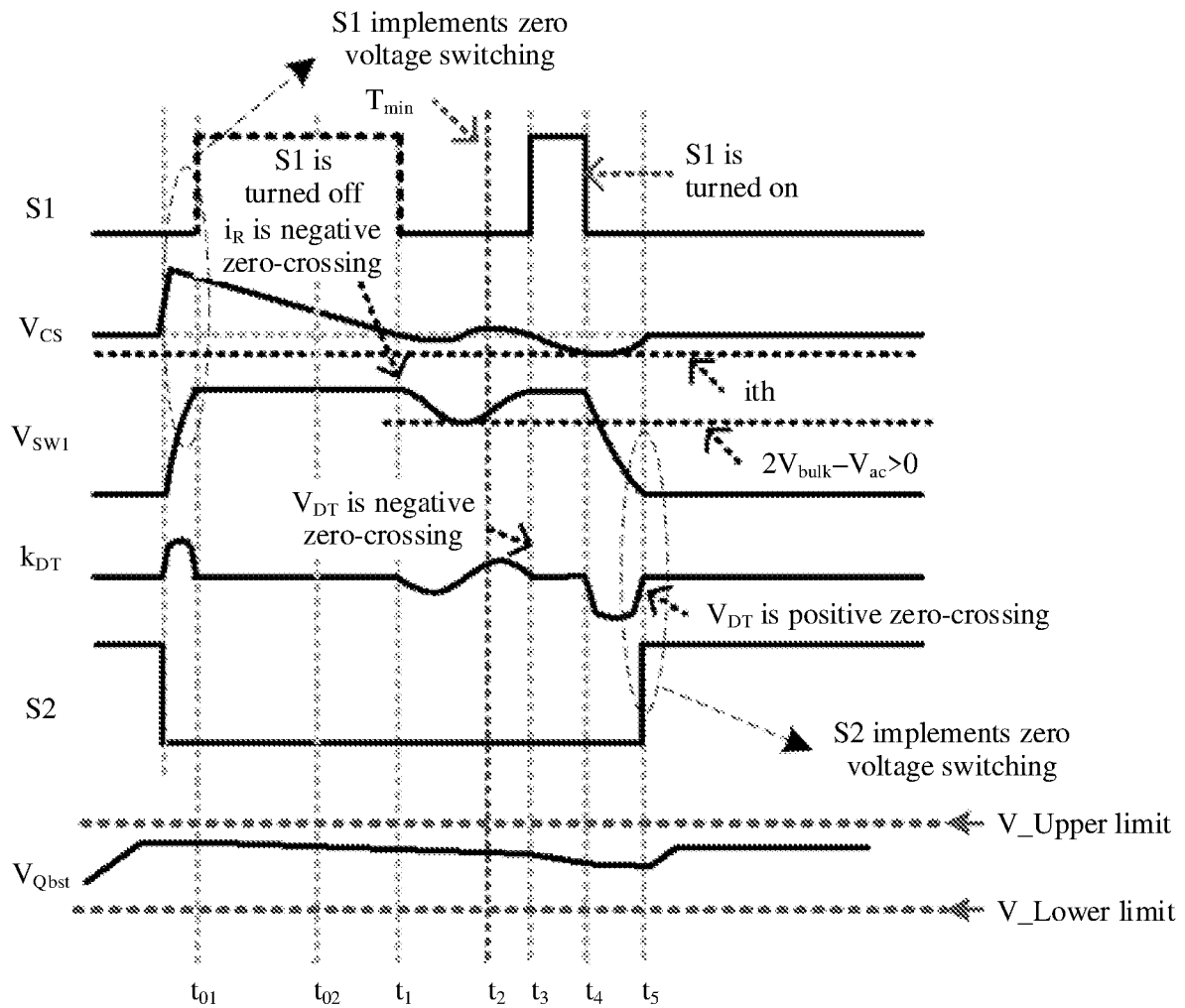
FIG. 9 is a simulation diagram of time-varying electrical parameters when another totem-pole PFC circuit enters a DCM operating mode according to an embodiment.

As shown in FIG. 9, when $V_{AC}$>0.5 $V_{OUT}$, the valley value 2 $V_{AC}$−$V_{OUT}$ of the voltage $V_{SW1}$ at the node SW1 is higher than 0 V. At a time point t01, the control unit 640 detects that duration T of a previous switching period is less than specified switching duration Tmin, and a switching frequency limitation occurs, and therefore delays for t02−t01. The control unit 550 receives an input voltage $V_D$T of an input end 6. If the control unit 550 detects that a voltage $V_{DT}$ of the node DT is negative zero-crossing, the control unit 550 determines a time point at which the voltage $V_{SW1}$ at the node SW1 oscillates to a peak value $V_{OUT}$.

At a time point t3, when detecting that the voltage $V_{SW1}$ at the node SW1 reaches the output voltage $V_{OUT}$, the control unit 550 sends a PWM S1 signal to the switch S1, so that the switch S1 is in an on state. This implements soft switching of the switch S1.

At a time point t4, after the switch S1 is turned on, the control unit 550 determines, based on a current $i_R$ input by the input end 5, a current $i_L$ passing through the PFC inductor L. If the control unit 550 detects that the current $i_L$ passing through the PFC inductor L is less than a specified current −ith, the control unit 550 stops sending the PWM S1 signal to the switch S1. The voltage $V_{SW1}$ at the node SW1 enters an oscillation process. In this case, the voltage $V_{SW1}$ at the node SW1 may oscillate to 0 V. If the control unit 550 detects that the current $i_L$ passing through the PFC inductor L is not less than the specified current −ith, the control unit 550 continues to detect the current $i_R$.

At a time point t5, the control unit 550 detects that the voltage $V_{DT}$ at the node DT is positive zero-crossing, indicating that the voltage $V_{SW1}$ at the node SW1 drops to 0 V. The control unit 550 may send a PWM S2 signal to the switch S2, so that the switch S2 is in a turn-on state again, and the totem-pole PFC circuit 510 enters a next switching period, to implement zero voltage switching of the switch S2.

Compared with the simulation result shown in FIG. 4, when the input voltage $V_{AC}$ of the totem-pole PFC circuit is in a positive half period, the bootstrap circuit in the apparatus 500 for controlling the totem-pole PFC circuit may need to turn on the switch S1 only once, the bootstrap voltage $V_{Qbst}$ in the bootstrap circuit fluctuates slightly, and a small amount of electricity of the bootstrap capacitor C is consumed. Therefore, the bootstrap capacitor in the bootstrap circuit may be small. This can reduce circuit costs and also facilitate miniaturization of a device installed with the totem-pole PFC circuit.

Figure 10A:
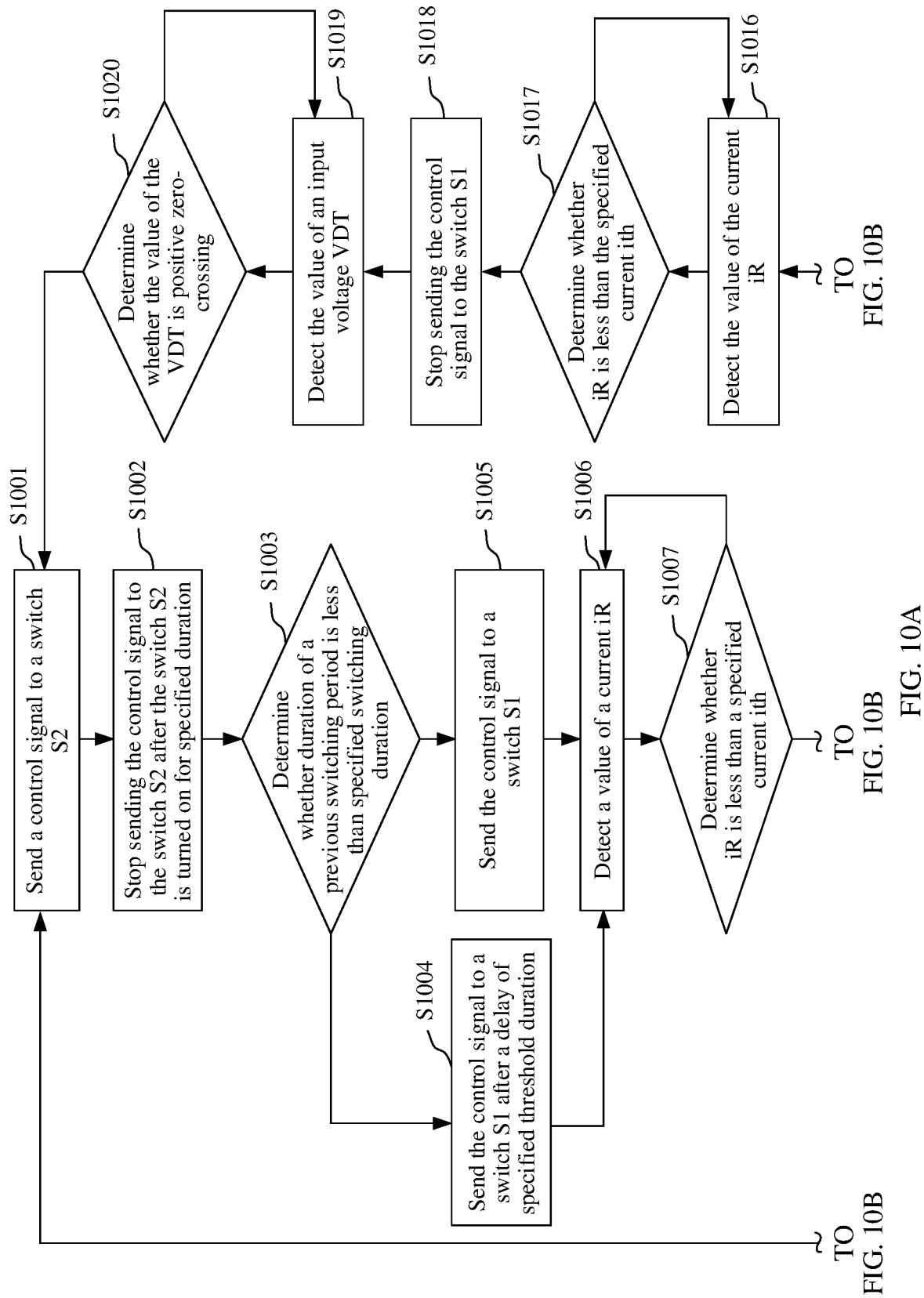
FIG. 10A and FIG. 10B are a flowchart of a method for controlling a totem-pole PFC circuit according to an embodiment.
Figure 10B:
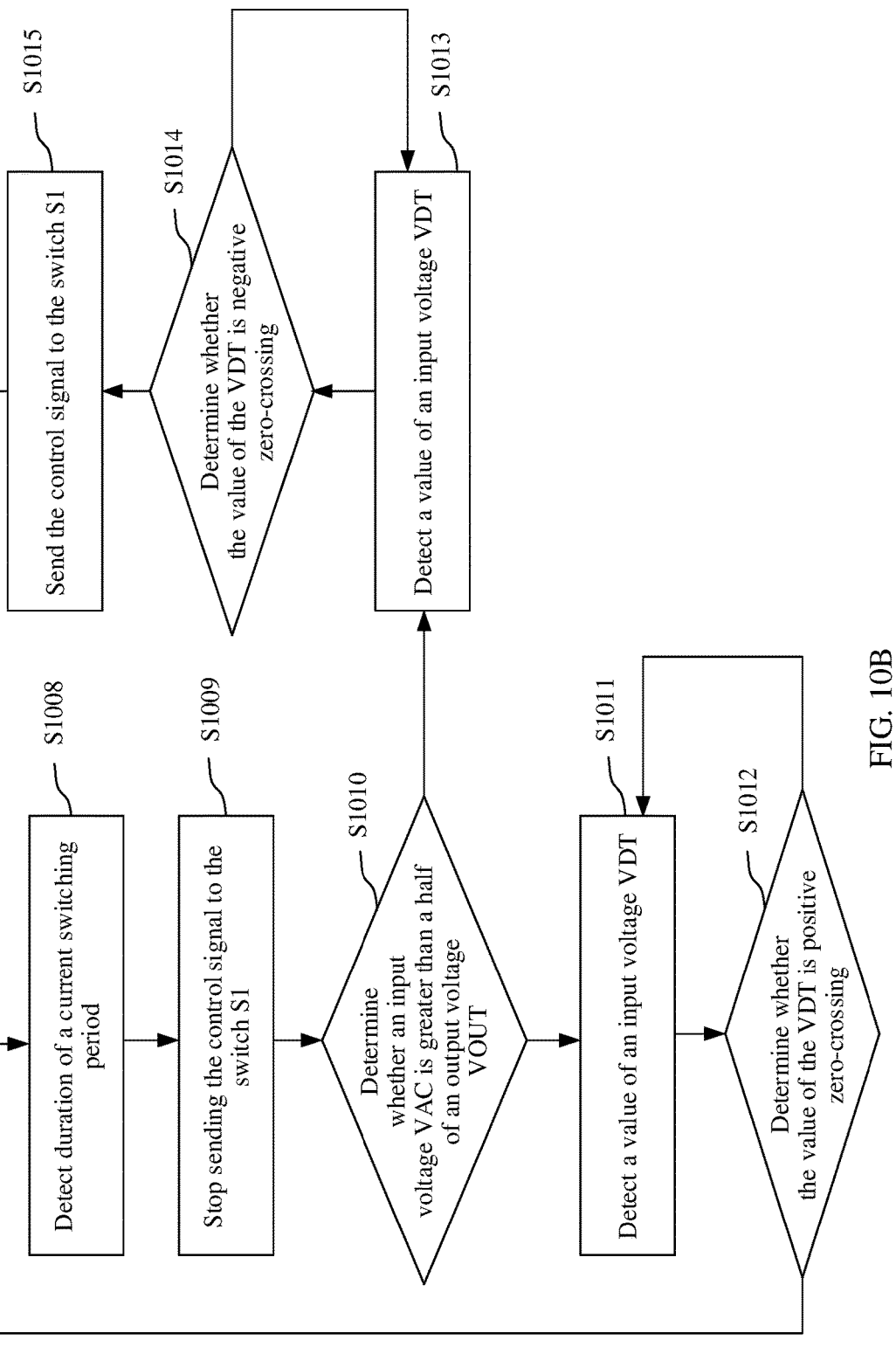

FIG. 10A and FIG. 10B are a flowchart of a method for controlling a totem-pole PFC circuit according to an embodiment. As shown in FIG. 10A and FIG. 10B, the method for controlling a totem-pole PFC circuit is performed by the control unit 550. When the input voltage $V_{AC}$ is in a positive half period, the control unit 550 may perform the following steps:

Step S1001: Send a control signal to the switch S2.

The input voltage detection unit 520 inputs a voltage $V_{AC}$ to the control unit 550. The control unit 550 determines, based on the input voltage $V_{AC}$, that the input voltage $V_{AC}$ is in a positive half period or a negative half period. If the input voltage $V_{AC}$ is in the positive half period, the control unit 550 sends a PWM S2 signal to the switch S2 in the totem-pole PFC circuit 510, so that the switch S2 is in an on state. In this case, the PFC inductor is in a charging state. A current flow direction in the totem-pole PFC circuit 510 is: the input end 1→the PFC inductor L→the switch S2→the switch S4→the input end 2.

Step S1002: Stop sending the control signal to the switch S2 after the switch S2 is turned on for specified duration.

Step S1003: Determine whether duration of a previous switching period is less than specified switching duration, that is, determine whether a switching frequency limit occurs on a switching frequency of the previous switching period. If the duration of the previous switching period is less than the specified switching duration, perform step S1004; or if the duration of the previous switching period is not less than the specified switching duration, perform S1005.

After the switch S2 is turned on, a current may be generated in a charging process of a capacitor such as a parasitic capacitor of the PFC inductor L and a parasitic capacitor of the switch S2. After each capacitor in the totem-pole PFC circuit 510 completes charging, the control unit 550 stops sending the PWM S2 signal to the switch S2, so that the switch S2 is in an off state. In this case, the current in the totem-pole PFC circuit 510 gradually decreases to 0 as the PFC inductor L is discharged. After the current iR is input through the input end 5, the control unit 550 detects a value of the current iR in the totem-pole PFC circuit 510 and determines a change of the current iR in the totem-pole PFC circuit 510.

If the control unit 550 detects that the current iR in the totem-pole PFC circuit 510 is not negative zero-crossing, the control unit 550 continues to detect the current iR in the totem-pole PFC circuit 510. If the control unit 550 detects that the current iR in the totem-pole PFC circuit 510 is negative zero-crossing, the totem-pole PFC circuit 510 is enabled to enter a DCM operating mode.

Step S1004: Send the control signal to the switch S1 after a delay of specified threshold duration.

Step S1005: Send the control signal to the switch S1.

After determining that the current $i_R$ in the totem-pole PFC circuit 510 is negative zero-crossing, the control unit 550 may determine whether duration of a previous switching period is less than a specified switching duration, that is, whether a switching frequency limit occurs on a switching frequency of the previous switching period. If the control unit 550 detects that the previous switching period is less than the specified switching duration, that is, switching frequency limitation occurs, the control unit 550 may delay the specified threshold duration, and then send a PWM S1 signal to the switch S1. The specified threshold duration is greater than or equal to a difference between the duration of the previous switching period and the specified switching duration.

If the control unit 550 detects that the previous switching period is not less than the specified switching duration, that is, no switching frequency limitation occurs, the control unit 550 may directly send the PWM S1 signal to the switch S1, so that the totem-pole PFC circuit 510 enters the DCM operating mode. In this case, a current flow direction in the totem-pole PFC circuit 510 is: the input end 1→the PFC inductor L→the switch S1→the output end 3→the output end 4→the switch S4→the input end 2. The current flow direction in the totem-pole PFC circuit 510 is opposite to the current flow direction in step S1001.

Step S1006: Detect the value of the current iR flowing through the resistor R.

Step S1007: Determine whether the current iR is less than a specified current ith. If the current iR is less than the specified current ith, perform step S1008; or if the current iR is not less than the specified current ith, perform step S1006.

Step S1008: Detect duration of a current switching period. That is, a switching frequency of the current switching period is detected.

Step S1009: Stop sending the control signal to the switch S1.

The control unit 550 may continue to detect the value of the current iR through the input end 5. If the control unit 550 detects that the current iR is less than the specified current ith, the PFC inductor stops sending the PWM S1 signal to the switch S1, so that the switch S1 is in an off state. If the control unit 550 detects that the current iR is not less than the specified current ith, the control unit 550 continues to detect the current iR.

After detecting that the current iR is less than the specified current ith, the control unit 550 obtains the duration of the current switching period. In a next switching period, the control unit 550 may compare whether the duration of the current switching period is less than the specified switching duration, determine whether the switching frequency of the current switching period meets a limitation of the maximum switching frequency, determine whether to delay the specified threshold duration in the next switching period, and then send the PWM S1 signal to the switch S1. The delayed specified threshold duration is a difference between the duration of the current switching period and specified switching duration. In an embodiment, the delayed specified threshold duration may be greater than or equal to the difference between the duration of the current switching period and the specified switching duration.

Step S1010: Determine whether the input voltage $V_{AC}$ is greater than a half of an output voltage $V_{OUT}$. If the input voltage $V_{AC}$ is greater than the half of the output voltage $V_{OUT}$, perform step S1013; or if the input voltage $V_{AC}$ is not greater than the half of the output voltage $V_{OUT}$, perform step S1011.

When determining that the totem-pole PFC circuit 510 enters the DCM operating mode, the control unit 550 may not send the PWM S1 signal to the switch S1 because a switching frequency of a previous switching period of the totem-pole PFC circuit 510 is greater than the maximum switching frequency, so that the switch S1 is in an off state. In this case, the totem-pole PFC circuit 510 enters an LC resonance, and the current $i_L$ that the PFC inductor L passes through is discharged forward. The control unit 550 determines the current switching period T based on the charging and discharging duration Ton+Toff of the PFC inductor L. If the control unit 550 determines that the duration T of the current switching period is greater than or equal to duration Tmin for the PFC inductor L to perform one complete charging and discharging under the limitation of the maximum switching frequency, it is necessary to determine whether the input voltage $V_{AC}$ is greater than a half of the output voltage $V_{OUT}$, and implement zero voltage switching of the switch S2 in different manners based on different results.

Step S1011: Detect a value of a voltage $V_{DT}$ at the node DT.

Step S1012: Determine whether the voltage $V_{DT}$ is positive zero-crossing. That is, whether the voltage $V_{DT}$ is less than zero. If the voltage $V_{DT}$ is less than zero, perform step S1001; or if the voltage $V_{DT}$ is not less than zero, perform step S1011.

When $V_{AC}<0.5\ V_{OUT}$, a valley value $2\ V_{AC}-V_{OUT}$ of the voltage $V_{SW1}$ at the node SW1 may be lower than 0 V. The control unit 550 receives the voltage $V_{DT}$ at the node DT. The voltage $V_{DT}$ at the node DT is equal to the voltage $V_{SW1}$ at the node SW1. When the voltage $V_{SW1}$ at the node SW1 oscillates to 0 V, the control unit 550 detects that the voltage $V_{DT}$ at the node DT changes from a negative value to 0 V and determines that the voltage $V_{DT}$ at the node DT is positive zero-crossing. The control unit 550 sends the PWM S2 signal to the switch S2, so that the switch S2 is in a turn-on state again, and the totem-pole PFC circuit 510 enters a next switching period, to implement zero voltage switching of the switch S2. When the voltage $V_{SW1}$ at the node SW1 does not oscillate to 0 V, the control unit 550 continues to detect the voltage $V_{DT}$ at the node DT.

Step S1013: Detect a value of a voltage $V_{DT}$ at the node DT.

Step S1014: Determine whether the voltage $V_{DT}$ is negative zero-crossing. That is, whether the voltage $V_{DT}$ is greater than zero. If the voltage $V_{DT}$ is greater than zero, perform step S1015; or if the voltage VDT is not greater than zero, perform step S1013.

Step S1015: Send the control signal to the switch S1.

When $V_{AC}$>0.5 $V_{OUT}$, a valley value 2 $V_{AC}$-$V_{OUT}$ of the voltage $V_{SW1}$ at the node SW1 may be higher than 0 V. When the voltage $V_{SW1}$ at the node SW1 oscillates to 0 V, the control unit 550 detects that the voltage $V_{DT}$ at the node DT changes from a positive value to 0 V and determines that the voltage $V_{DT}$ at the node DT is negative zero-crossing. In this case, the voltage $V_{SW1}$ at the node SW1 oscillates to a peak value $V_{OUT}$. When detecting that the voltage $V_{SW1}$ at the node SW1 reaches the output voltage $V_{OUT}$, the control unit 550 sends the PWM S1 signal to the switch S1, so that the switch S1 is in an on state, to implement soft switching of the switch S1.

Step S1016: Detect the value of the current iR flowing through the resistor R.

Step S1017: Determine whether the current iR is less than a specified current ith. If the current iR is less than the specified current ith, perform step S1018; or if the current iR is not less than the specified current ith, perform step S1016.

Step S1017: Stop sending the control signal to the switch S1.

The control unit 550 may continue to detect the value of the current iR through the input end 5. If the control unit 550 detects that the current iR is less than the specified current ith, the control unit 550 stops sending the PWM S1 signal to the switch S1. The voltage $V_{SW1}$ at the node SW1 enters an LC oscillation process. In this case, the voltage $V_{SW1}$ at the node SW1 may oscillate to 0 V. If the control unit 550 detects that the current iR is not less than the specified current ith, the control unit 550 continues to detect the current iR.

Step S1019: Detect a value of the voltage $V_{DT}$ at the node DT.

Step S1020: Determine whether the voltage $V_{DT}$ is negative zero-crossing. That is, whether the voltage $V_{DT}$ is greater than zero. If the voltage $V_{DT}$ is greater than zero, perform step S1001; or if the voltage VDT is not greater than zero, perform step S1019.

The control unit 550 may receive the voltage $V_{DT}$ at the node DT. The voltage $V_{DT}$ at the node DT is equal to the voltage $V_{SW1}$ at the node SW1. When the voltage $V_{SW1}$ at the node SW1 oscillates to 0 V, the control unit 550 detects that the voltage $V_{DT}$ at the node DT changes from a negative value to 0 V and determines that the voltage $V_{DT}$ at the node DT is positive zero-crossing. The control unit 550 sends the PWM S2 signal to the switch S2, so that the switch S2 is in a turn-on state again, and the totem-pole PFC circuit 510 enters a next switching period, to implement zero voltage switching of the switch S2. When the voltage $V_{SW1}$ at the node SW1 does not oscillate to 0 V, the control unit 550 continues to detect the voltage $V_{DT}$ at the node DT.

An embodiment may provide an electronic device. The electronic device includes an apparatus for controlling a totem-pole PFC circuit. The control apparatus of the totem-pole PFC circuit may be the control apparatus of the totem-pole PFC circuit recorded in FIG. 5 to FIG. 10A and FIG. 10B and the foregoing corresponding solutions. Because the electronic device includes the control apparatus of the totem-pole PFC circuit, the electronic device includes all or at least some advantages of the apparatus for controlling a totem-pole PFC circuit. The electronic device may be a base station, a charging pile, a switch, an electric vehicle, or the like. This is not limited herein.

In the descriptions, the described features, structures, materials, or characteristics may be combined in a proper manner in any one or more of embodiments or examples.

Further, it should be noted that the foregoing embodiments are merely intended for describing the solutions, but are not limiting. Although described in detail with reference to the foregoing embodiments, persons of ordinary skill in the art should understand that they may still make modifications without departing from the spirit and scope of the embodiments.

What is claimed is:

1. A method for controlling a totem-pole PFC circuit, wherein the method is performed by a controller, the method comprising:
    sampling an electrical parameter of a PFC inductor in the totem-pole PFC circuit;
    determining duration of a previous switching period of the totem-pole PFC circuit based on the electrical parameter of the PFC inductor, wherein the duration of the previous switching period is determined based on duration of previous charging of the PFC inductor and duration of previous discharging of the PFC inductor; and
    sending a control signal to a first switch when the duration of the previous switching period is less than specified switching duration, wherein the first switch is a switch that enables the PFC inductor to be discharged when an alternating current of an input end of the totem-pole PFC circuit is in a positive half period, and the control signal is used to enable a bootstrap capacitor in a bootstrap circuit coupled to the switch to be discharged.

2. The method according to claim 1, wherein determining the duration of the previous switching period of the totem-pole PFC circuit based on the electrical parameter of the PFC inductor further comprises:
    detecting a current value of a current flowing through the PFC inductor, wherein the electrical parameter is the current value; and
    determining a time point at which a current value of a current previously flowing through the PFC inductor decreases from a first threshold to zero and a time point at which the current value of the current previously flowing through the PFC inductor rises from zero to the first threshold, to obtain the duration of the previous switching period.

3. The method according to claim 1, wherein the sending the control signal to the first switch further comprises:
    sending the control signal to the first switch after a delay of specified threshold duration, wherein the specified threshold duration is greater than or equal to a difference between the specified switching duration and the previous switching period.

4. The method according to claim 1, further comprising:
    detecting the current value of the current flowing through the PFC inductor, wherein the electrical parameter is the current value; and
    determining duration of a current switching period of the totem-pole PFC circuit when the current value of the current flowing through the PFC inductor is less than a second threshold.

5. The method according to claim 1, further comprising:
    stopping sending the control signal to the first switch;
    sampling an electrical parameter of the input end of the totem-pole PFC circuit and an electrical parameter of an output end of the totem-pole PFC circuit, wherein the output end is a port through which the totem-pole PFC circuit outputs a direct current to the outside; and sending the control signal to a second switch, wherein the second switch is a switch that enables the PFC inductor to be charged when the alternating current of the input end of the totem-pole PFC circuit is in the positive half period.

6. The method according to claim 5, wherein sending the control signal to the second switch further comprises:
   detecting an input voltage of a detection circuit when a voltage of the input end of the totem-pole PFC circuit is not greater than a half of a voltage of the output end of the totem-pole PFC circuit, wherein the input voltage of the detection circuit is a voltage from a high-frequency bridge arm in the totem-pole PFC circuit to a resistor in the detection circuit; and
   sending the control signal to the second switch when the input voltage of the detection circuit is positive zero-crossing.

7. The method according to claim 5, wherein sending the control signal to the second switch further comprises:
   detecting an input voltage of a detection circuit when a voltage of the input end of the totem-pole PFC circuit is greater than a half of a voltage of the output end of the totem-pole PFC circuit;
   sending the control signal to the first switch when the input voltage of the detection circuit is negative zero-crossing;
   detecting the current value of the current flowing through the PFC inductor;
   stopping sending the control signal to the first switch when the current value of the current flowing through the PFC inductor is determined to be less than the second threshold; and
   sending the control signal to the second switch when the input voltage of the detection circuit is positive zero-crossing.

8. The method according to claim 1, wherein, before determining the duration of the previous switching period of the totem-pole PFC circuit based on the electrical parameter of the PFC inductor, the method further comprises:
   sending the control signal to the second switch;
   detecting the current value of the current flowing through the PFC inductor; and
   stopping sending the control signal to the second switch when the current value of the current flowing through the PFC inductor is determined to be negative zero-crossing.

9. An apparatus for controlling a totem-pole PFC circuit, comprising:
   the totem-pole PFC circuit,
   a detection circuit,
   an input voltage detection unit,
   an output voltage detection unit, and
   a control unit, wherein
   the detection circuit is configured to output an electrical parameter of a PFC inductor of the totem-pole PFC circuit to the control unit;
   the input voltage detection unit is configured to output a voltage of an alternating current of an input end of the totem-pole PFC circuit to the control unit;
   the output voltage detection unit is configured to output a voltage of a direct current of an output end of the totem-pole PFC circuit to the control unit; and
   the control unit is configured to: determine duration of a previous switching period of the totem-pole PFC circuit based on the electrical parameter of the PFC inductor, wherein the duration of the previous switching period is determined based on duration of previous charging of the PFC inductor and duration of previous discharging of the PFC inductor; and
   send a control signal to a first switch when the duration of the previous switching period is less than specified switching duration, wherein the first switch is a switch that enables the PFC inductor to be discharged when the alternating current of the input end of the totem-pole PFC circuit is in a positive half period, and the control signal is used to enable a bootstrap capacitor in a bootstrap circuit coupled to the switch to be discharged.

10. The apparatus according to claim 9, wherein the control unit is further configured to determine, based on a current value that is of the PFC inductor and that is input by a third port, a time point at which a current value of a current previously flowing through the PFC inductor decreases from a first threshold to zero and a time point at which the current value of the current previously flowing through the PFC inductor rises from zero to the first threshold, to obtain the duration of the previous switching period.

11. The apparatus according to claim 9, wherein the control unit is further configured to send the control signal to the first switch after a delay of specified threshold duration, wherein the specified threshold duration is greater than or equal to a difference between the specified switching duration and the previous switching period.

12. The apparatus according to claim 9, wherein the control unit is further configured to determine, based on the current value that is of the PFC inductor and that is input by the third port, duration of a current switching period of the totem-pole PFC circuit when the current value of the current flowing through the PFC inductor is less than a second threshold.

13. The apparatus according to claim 9, wherein the control unit is further configured to:
   stop sending the control signal to the first switch; and
   send the control signal to a second switch based on the voltage input by the input voltage detection unit and the voltage input by the output voltage detection unit, wherein the second switch is a switch that enables the PFC inductor to be charged when the alternating current of the input end of the totem-pole PFC circuit is in the positive half period.

14. The apparatus according to claim 13, wherein the control unit is further configured to:
   detect an input voltage of the detection circuit when the voltage of the input end of the totem-pole PFC circuit is not greater than a half of the voltage of the output end of the totem-pole PFC circuit, wherein the input voltage of the detection circuit is a voltage from a high-frequency bridge arm in the totem-pole PFC circuit to a resistor in the detection circuit; and send the control signal to the second switch when the input voltage of the detection circuit is positive zero-crossing.

15. The apparatus according to claim 13, wherein the control unit is further configured to:
   detect an input voltage of the detection circuit when the voltage of the input end of the totem-pole PFC circuit is greater than a half of the voltage of the output end of the totem-pole PFC circuit;
   send the control signal to the first switch when the input voltage of the detection circuit is negative zero-crossing;
   detect the current value of the current flowing through the PFC inductor;

stop sending the control signal to the first switch when the current value of the current flowing through the PFC inductor is determined to be less than the second threshold; and send the control signal to the second switch when the input voltage of the detection circuit is positive zero-crossing.

16. The apparatus according to claim 9, wherein the control unit is further configured to:

send the control signal to the second switch;

detect the current value of the current flowing through the PFC inductor; and stop sending the control signal to the second switch when the current value of the current flowing through the PFC inductor is determined to be negative zero-crossing.

17. An electronic device, comprising an apparatus for controlling a totem-pole PFC circuit, wherein the apparatus for controlling the totem-pole PFC circuit, comprises:

the totem-pole PFC circuit, a detection circuit, an input voltage detection unit, an output voltage detection unit, and a control unit;

the detection circuit is configured to output an electrical parameter of a PFC inductor of the totem-pole PFC circuit to the control unit;

the input voltage detection unit is configured to output a voltage of an alternating current of an input end of the totem-pole PFC circuit to the control unit;

the output voltage detection unit is configured to output a voltage of a direct current of an output end of the totem-pole PFC circuit to the control unit; and the control unit is configured to: determine duration of a previous switching period of the totem-pole PFC circuit based on the electrical parameter of the PFC inductor, wherein the duration of the previous switching period is determined based on duration of previous charging of the PFC inductor and duration of previous discharging of the PFC inductor; and send a control signal to a first switch when the duration of the previous switching period is less than specified switching duration, wherein the first switch is a switch that enables the PFC inductor to be discharged when the alternating current of the input end of the totem-pole PFC circuit is in a positive half period, and the control signal is used to enable a bootstrap capacitor in a bootstrap circuit coupled to the switch to be discharged.

* * * * *

UNITED STATES PATENT AND TRADEMARK OFFICE
CERTIFICATE OF CORRECTION

PATENT NO. : 12,395,073 B2  
APPLICATION NO. : 18/347040  
DATED : August 19, 2025  
INVENTOR(S) : Ken Chin et al.

Page 1 of 1

It is certified that error appears in the above-identified patent and that said Letters Patent is hereby corrected as shown below:

In the Claims

Column 20, Claim 3, Line 46, please remove "the" so the line reads as "The method according to claim 1, wherein sending".

Signed and Sealed this  
Eighteenth Day of November, 2025

John A. Squires  
*Director of the United States Patent and Trademark Office*